Jan. 13, 1970  G. SHAPIRO ET AL  3,490,041
ELECTRONIC FAULT FINDING SYSTEM USING ACCEPTABLE LIMITS TESTING
Filed Aug. 28, 1964  24 Sheets-Sheet 15
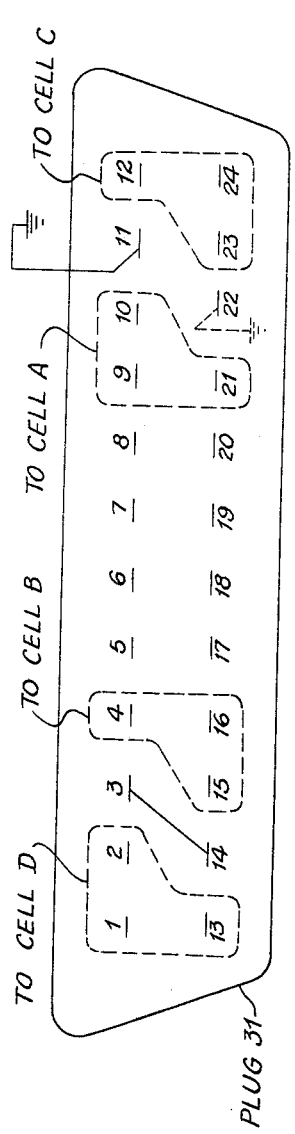
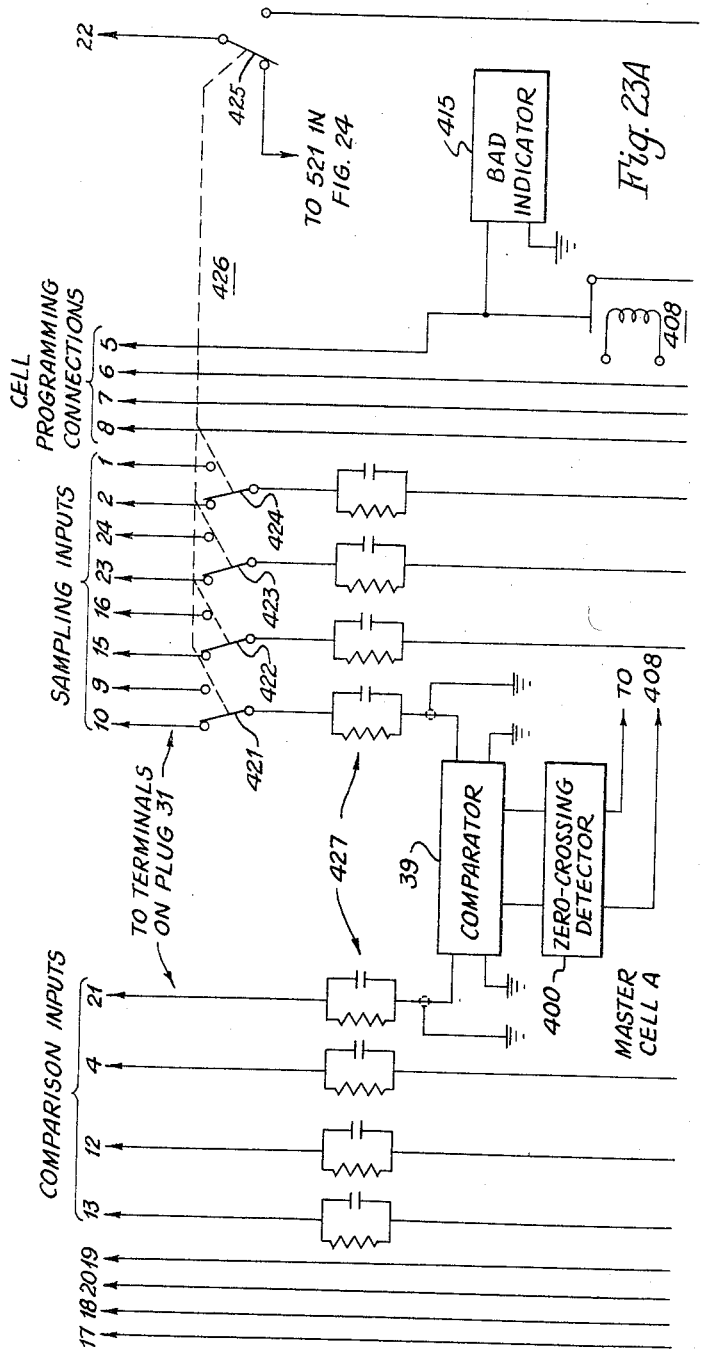
Fig. 23
Fig. 23A
Fig. 23B
Fig. 23A

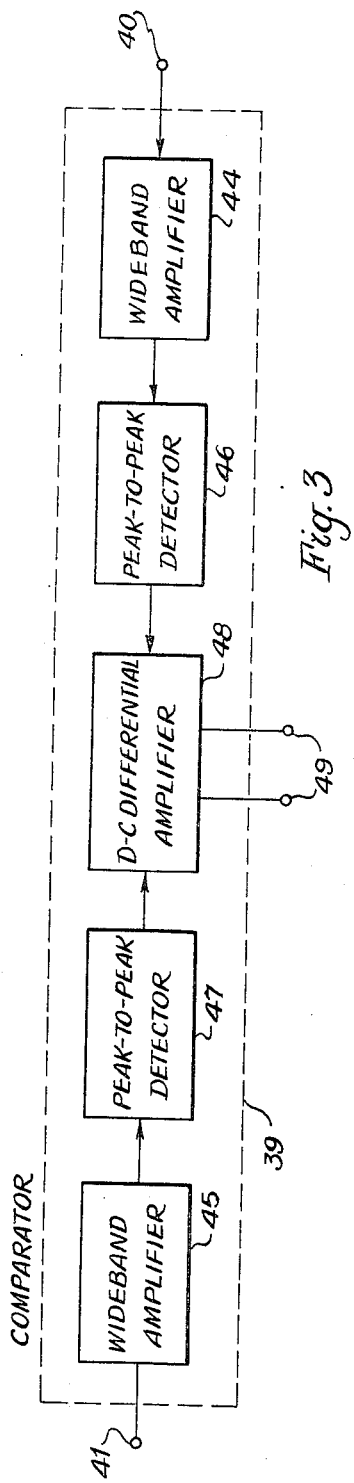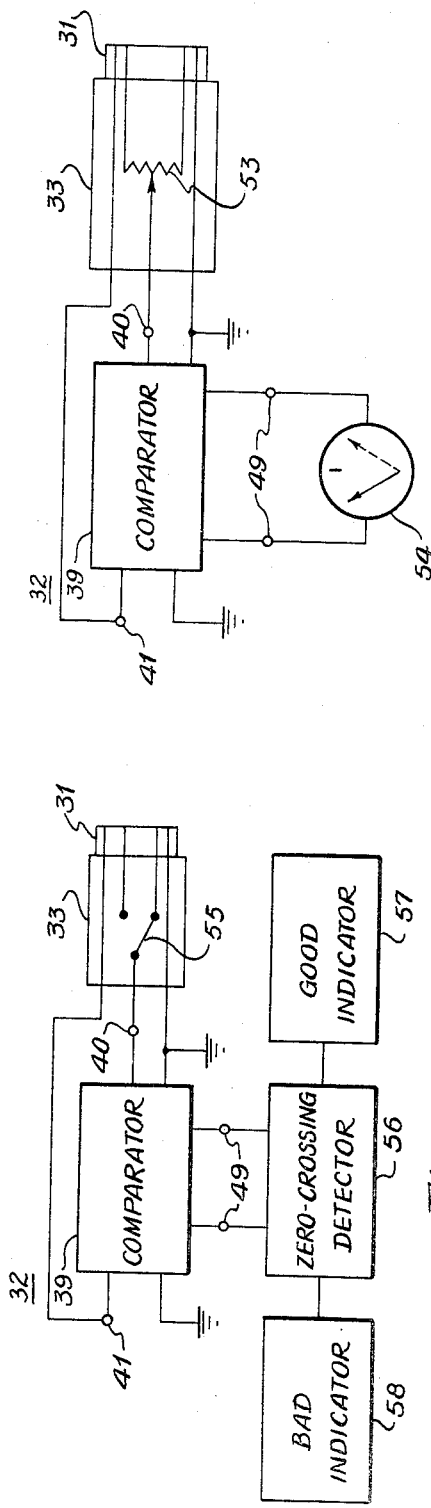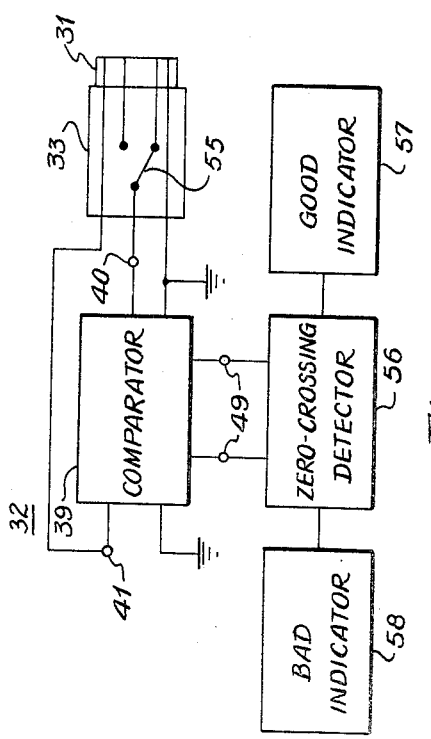

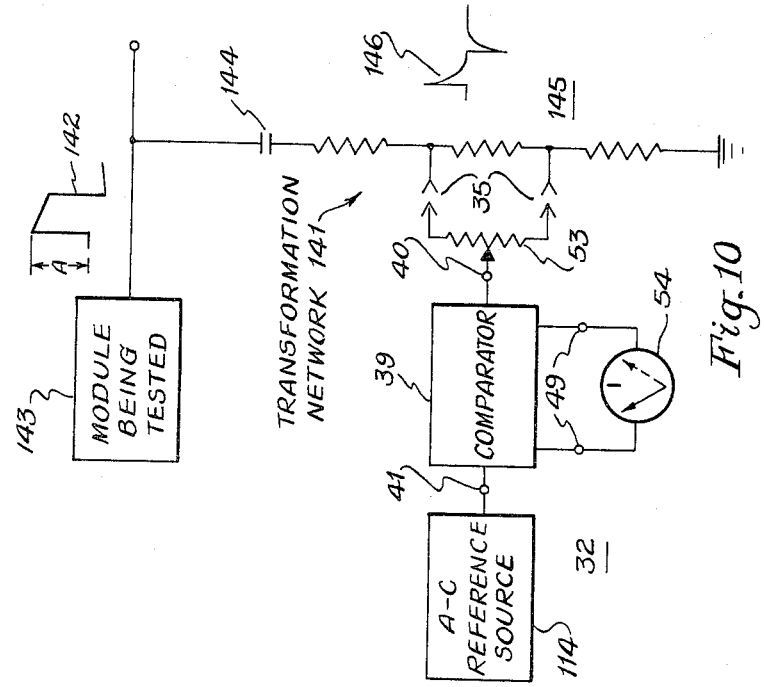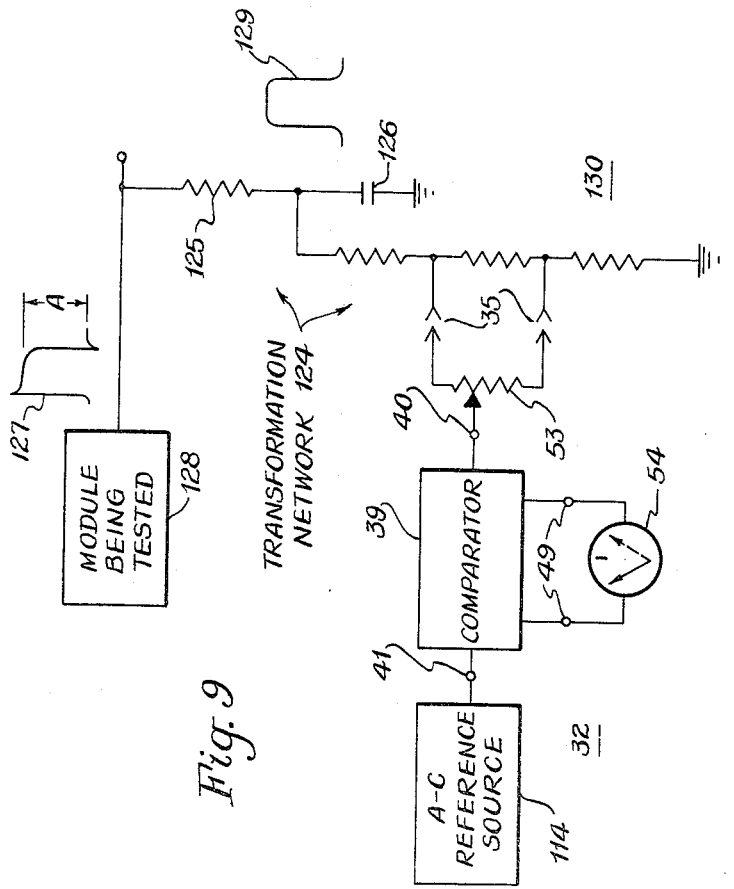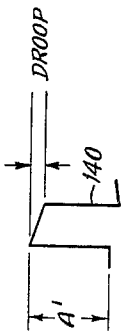

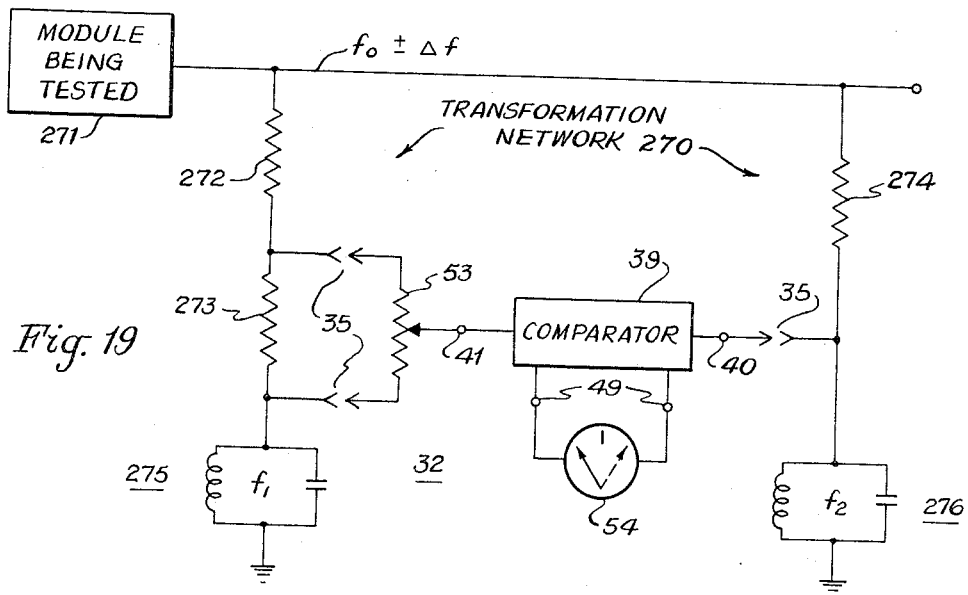
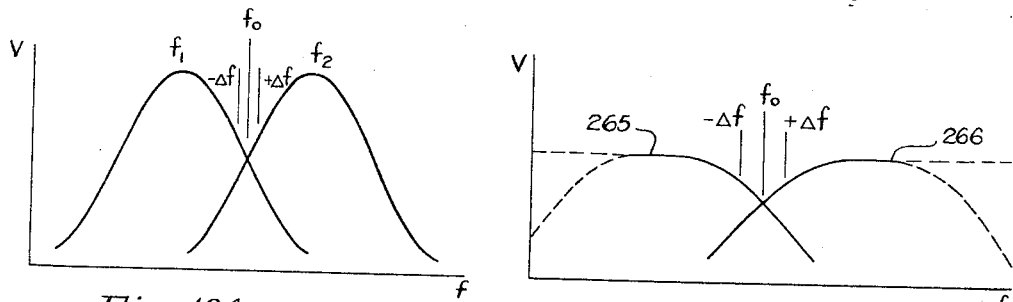
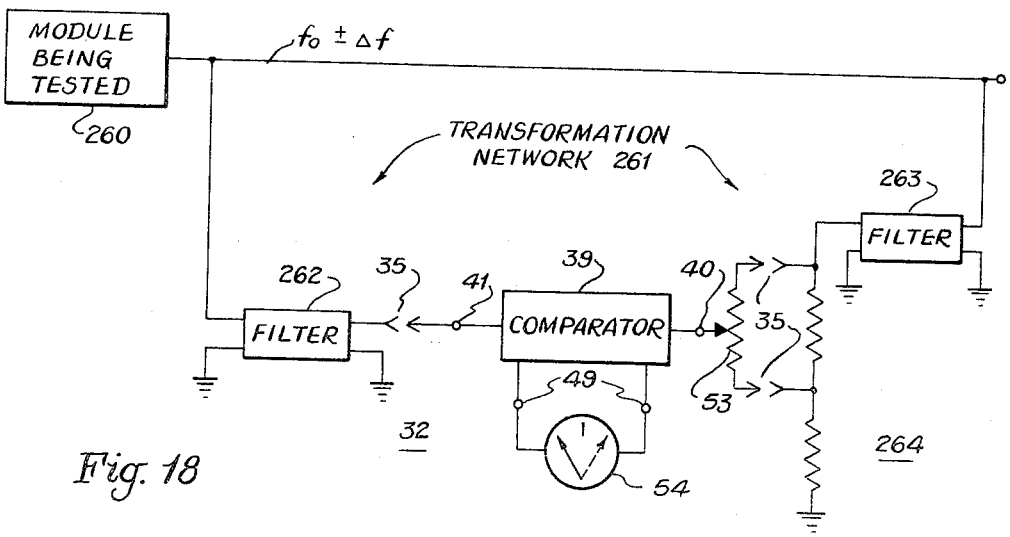

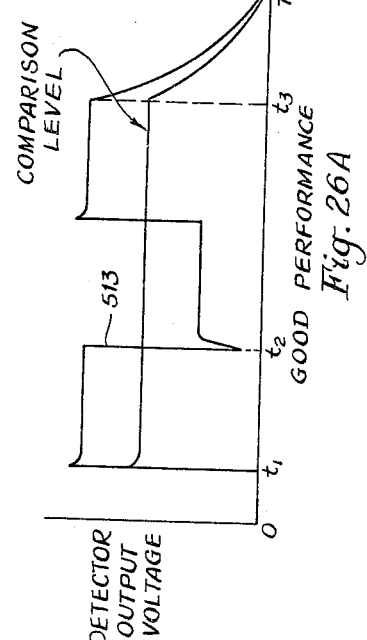
Fig. 25A GOOD PERFORMANCE
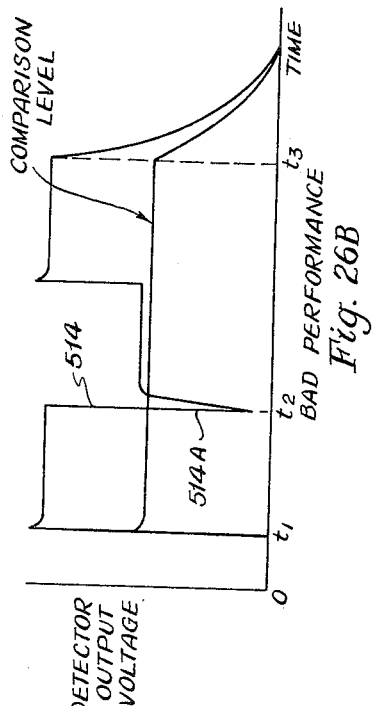
Fig. 25B BAD PERFORMANCE
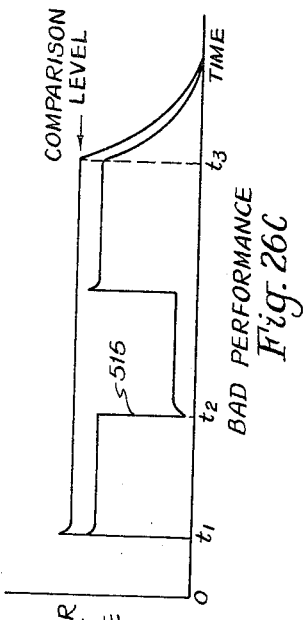
Fig. 25C BAD PERFORMANCE
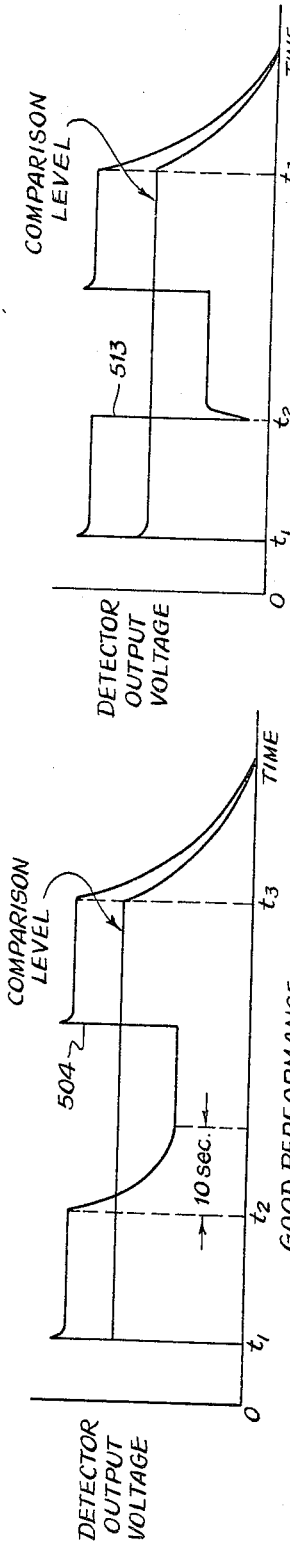
Fig. 26A GOOD PERFORMANCE
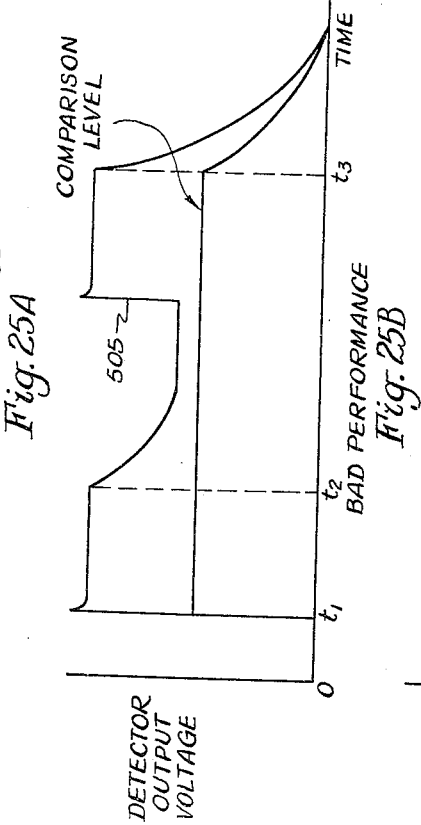
Fig. 26B BAD PERFORMANCE
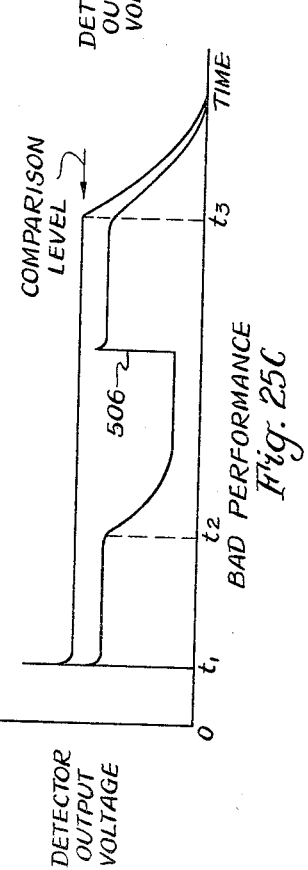
Fig. 26C BAD PERFORMANCE

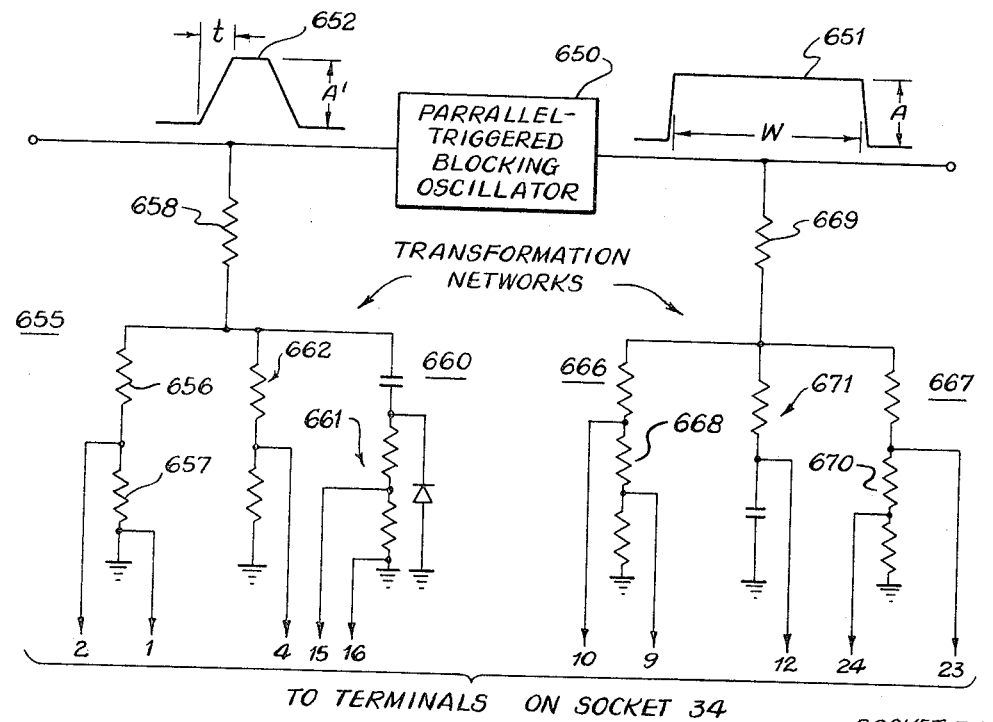
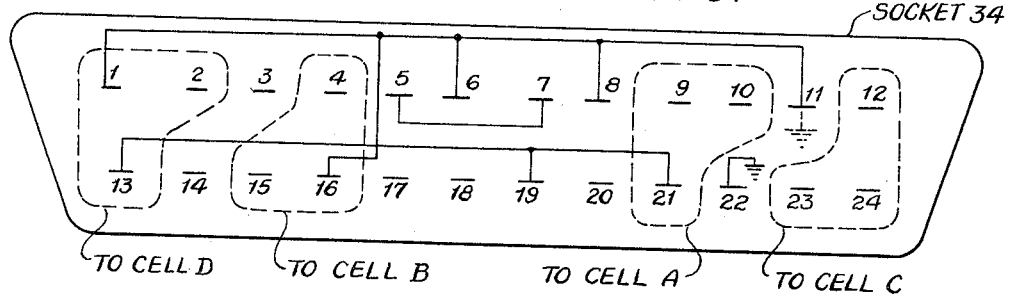
Fig. 28

United States Patent Office 3,490,041
Patented Jan. 13, 1970

---

3,490,041
ELECTRONIC FAULT FINDING SYSTEM USING ACCEPTABLE LIMITS TESTING
Gustave Shapiro, Silver Spring, Md., George J. Rogers, McLean, Va., and Owen B. Laug, Rockville, Md., assignors to the United States of America as represented by the Secretary of Commerce
Filed Aug. 28, 1964, Ser. No. 392,979
Int. Cl. G01r 15/12, 27/00, 11/00
U.S. Cl. 324—73                                    47 Claims

---

ABSTRACT OF THE DISCLOSURE

A system is described for testing a wide variety of dynamic and static parameters in each module in electronic equipment for performance within acceptable design limits. The limits are designed into transformation means, each responsive to one or more signals for generating a comparison and two sampling signals. The performance of a module is considered to be within acceptable limits when a comparator determines that the magnitude of the comparison signal lies between those of the sampling signals. A qualification test indicates whether an electrical input to a module is within design limits. Qualification and performance tests may be made simultaneously. An indicator shows that a qualification test is bad or that the module performance is either good or bad.

---

This invention relates to a system using semiautomatic techniques to isolate faults by evaluating a variety of characteristics of the electronic equipment being tested. When the equipment is composed of modules, a single characteristic of each module may be evaluated, or several characteristics of a module may be evaluated simultaneously without removing the module from the equipment.

In recent years, there has been a sharp increase in the amount, diversity, and complexity of electronic devices, and as a result insufficient trained technicians are available to maintain the devices in the field. To surmount this difficulty, design engineers have turned to automation and have developed automatic check-out systems. These systems have rapidly become very complicated, costly and specialized, and although it was claimed in the beginning that they would require few, untrained personnel, experience has proven this is not the case. Actually, due to their complexity, the personnel who operate an automatic check-out system must be rather well trained. In addition, the system may be so very complicated that additional automatic test equipment is required to insure its proper operation.

Further, since sophisticated measurements can not be made with automatic test equipment, one must be content with those that provide a very limited amount of information, such as the voltage level of a signal. Only occasionally can the function of an assembly be evaluated by measuring some key voltage. More often the only way to assess the performance of a circuit is to measure its ability to provide the function for which it was designed. If, however, one were to try to make the more refined, dynamic measurements with automatic equipment, it would soon become prohibitively complex.

In general, automatic test equipment rigidly programs all of the tests; and while this appears desirable when the operating technician is not knowledgeable, it does not take long for the technician to acquire some experience. If the test equipment does not permit him to use his acquired knowledge to speed up the fault location program, he inevitably becomes prejudiced against the equipment, and this prevents him from exploiting it to the fullest possible extent. Again, technicians regard a complicated testing system with suspicion since they are never sure when it is operating properly. Elaborate testing devices are therefore required to reassure them, and even then, they are not always reassured.

Accordingly, it is an object of the present invention to provide a system that will permit an untrained technician, operating under field conditions to make meaningful performance measurements on a variety of complicated electronic assemblies after only five or ten minutes of simple instruction.

Other features and objects of this invention are summarized as follows:

To provide a system that will permit dynamic tests, on diverse and complex circuits, that can determine the effectiveness with which each circuit performs the function for which it was designed.

To provide a system for use by the untrained technician, who is not required to make any decisions, as well as a system that will not prevent the knowledgeable technician from using his initiative to improve the efficiency and effectiveness of the system.

To provide a test set that has very simple and uniform operation, regardless of the type of test being made. It is not necessary for the technician to have any knowledge of the circuit being tested or the type of test being performed.

To provide a system that will not give false information when it is not possible to make a valid test.

To provide a system that may be designed for fault location in modularized equipment so that the untrained technician can effect a rapid repair by replacing the defective assembly. These techniques are capable of isolating defects in simple functional assemblies as well as in complex assemblies.

To provide a test set that incorporates self-testing techniques which are readily comprehended by the untrained technician thereby enhancing his confidence in the proper functioning of the test set when the self-test so indicates.

To provide a system that permits efficient test-programming techniques to obviate the necessity for testing every module.

To provide a system that permits set-up and testing time under field conditions that is orders of magnitude shorter than the set-up and testing time required for conventional automatic test equipment.

Other objects and many of the attendant advantages of this invention will be readily appreciated from the following detailed description when considered in connection with the accompanying drawings in which like reference numerals designate like parts throughout the figures thereof and wherein:

FIG. 1 discloses an arrangement that embodies an underlying concept of the present invention.

FIG. 3 illustrates a peak-to-peak comparator contained in a test instrument used in the system shown in FIG. 2.

FIG. 4 is an embodiment of a one-cell test instrument that may be used in the system in FIG. 2.

FIG. 5 is a second embodiment of a one-cell test instrument finding application in the system in FIG. 2.

Figure 6:
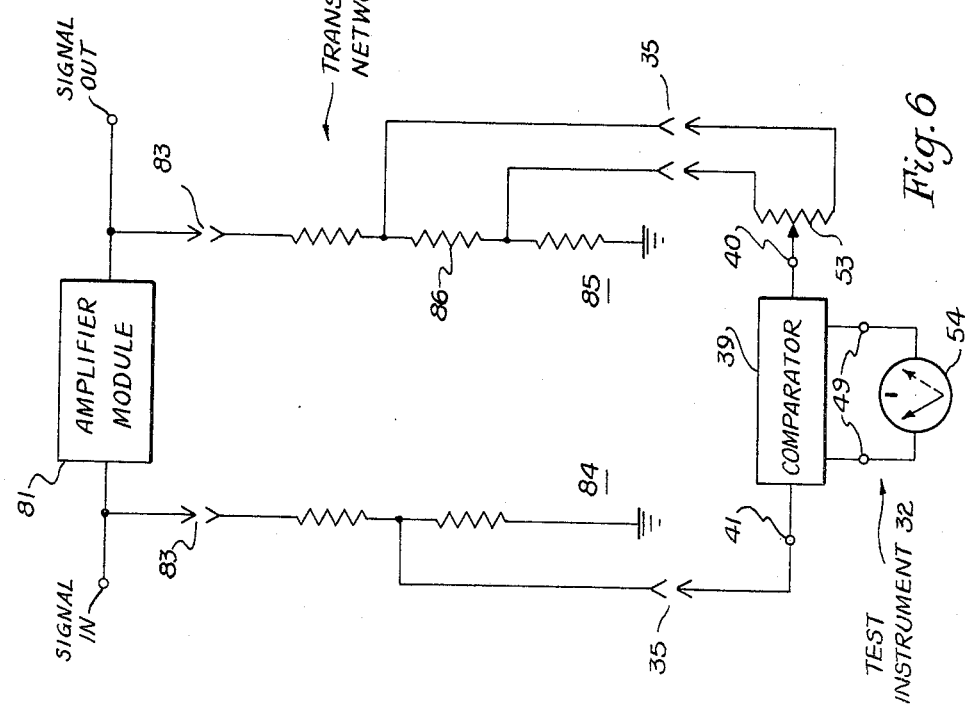

FIG. 6 discloses a transformation network used in the measurement of amplification and illustrates the operation of the embodiment of the test instrument in FIG. 4.

Figure 7:
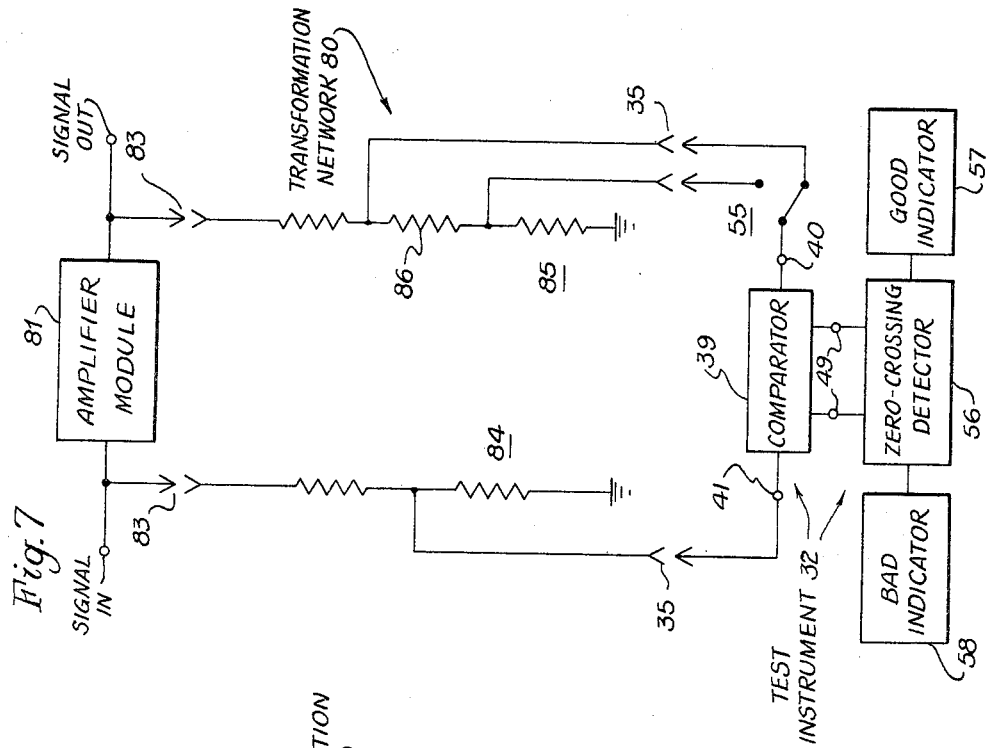

FIG. 7 illustrates the operation of the embodiment of the test instrument in FIG. 5.

Figure 8:
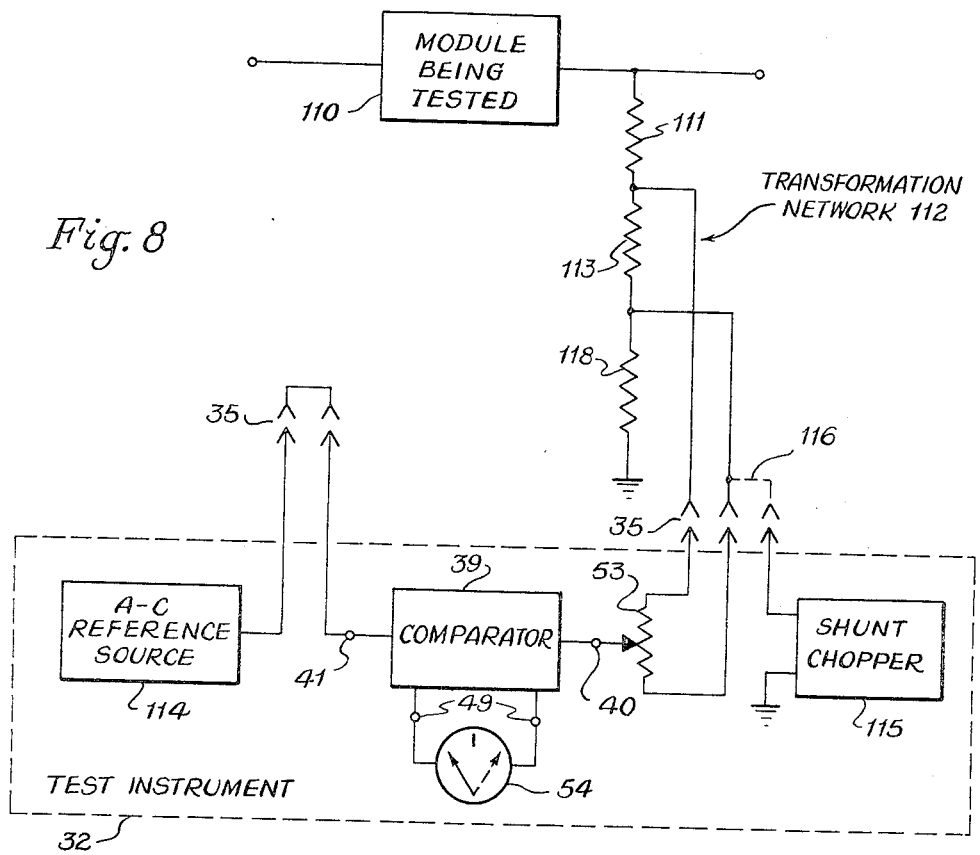

FIG. 8 contains a transformation network used in the measurement of voltage amplitude.

FIG. 9 shows a transformation network for measuring the amplitude of a waveform in which overshoot is present.

FIG. 9A comprises waveforms used in explaining the function of the transformation network in FIG. 9.

FIG. 10 shows a transformation network for measuring the amplitude of a waveform containing droop.

FIG. 10A is a waveform employed in explaining the function of the transformation network in FIG. 10.

Figure 11:
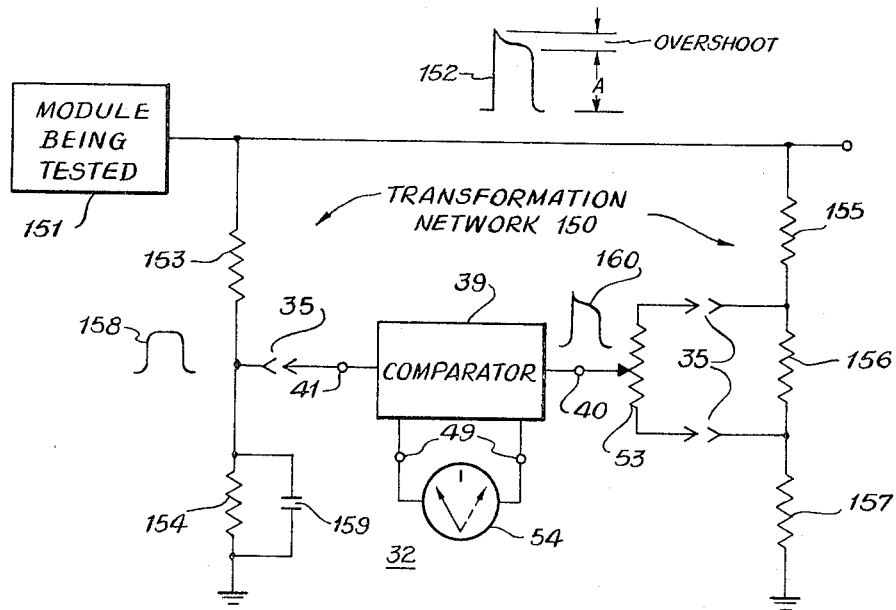

FIG. 11 discloses a transformation network utilized in the measurement of percent overshoot.

Figure 12:
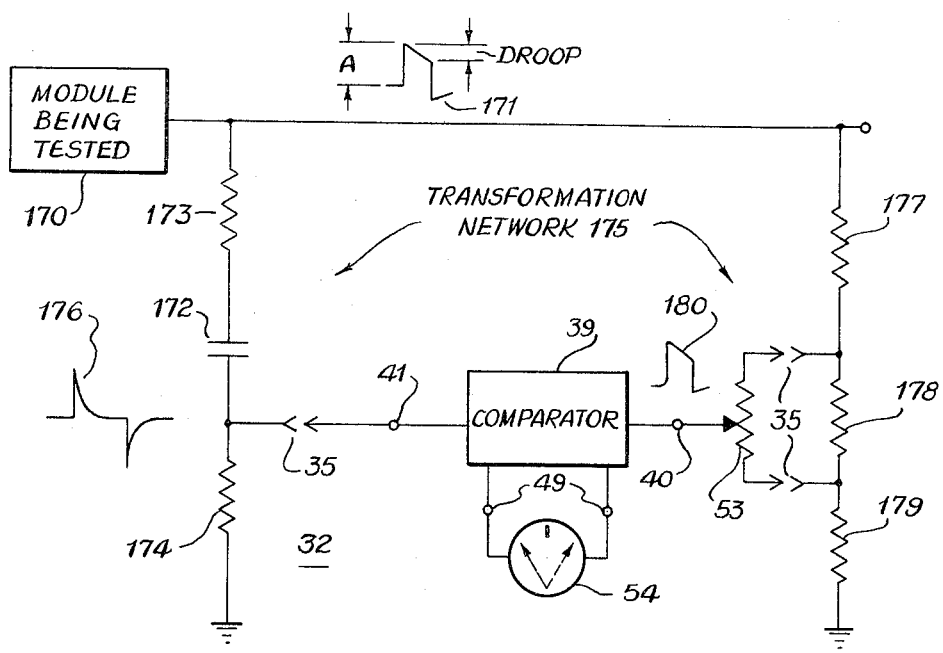

FIG. 12 includes a transformation network than can be used to measure droop as a percent of signal amplitude.

Figure 13:
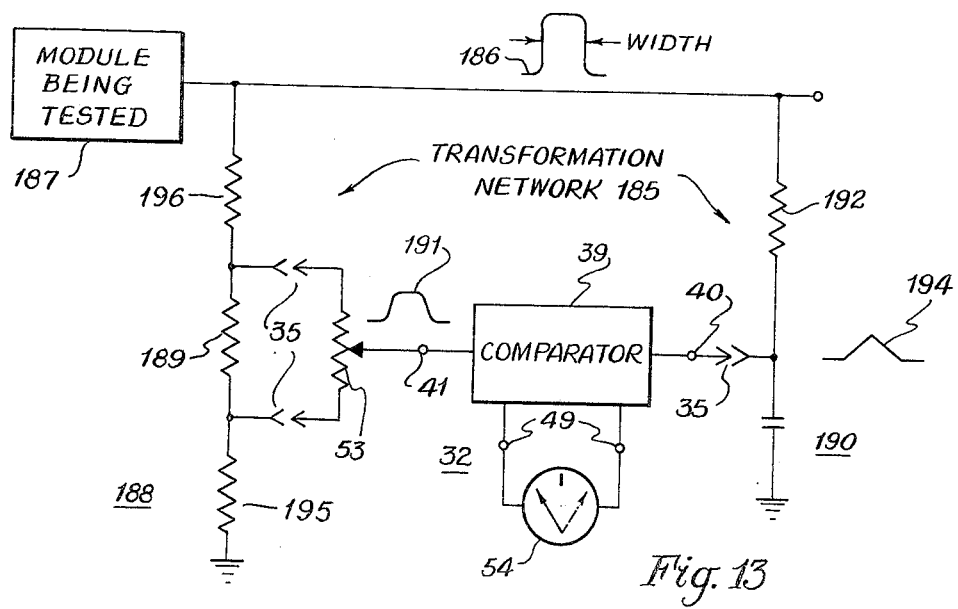

FIG. 13 shows a transformation network that can be employed in the measurement of pulse width.

Figure 14:
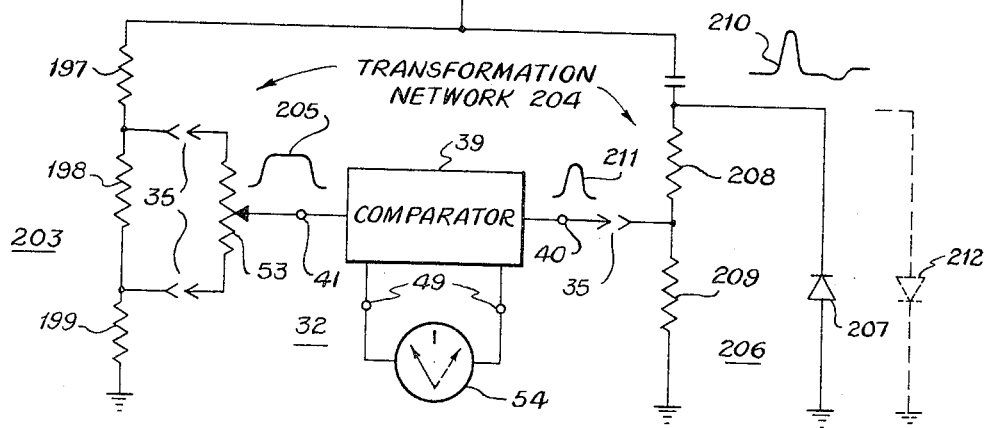

FIG. 14 presents a transformation network that is used to measure the rise or decay time of a waveform.

Figure 15:
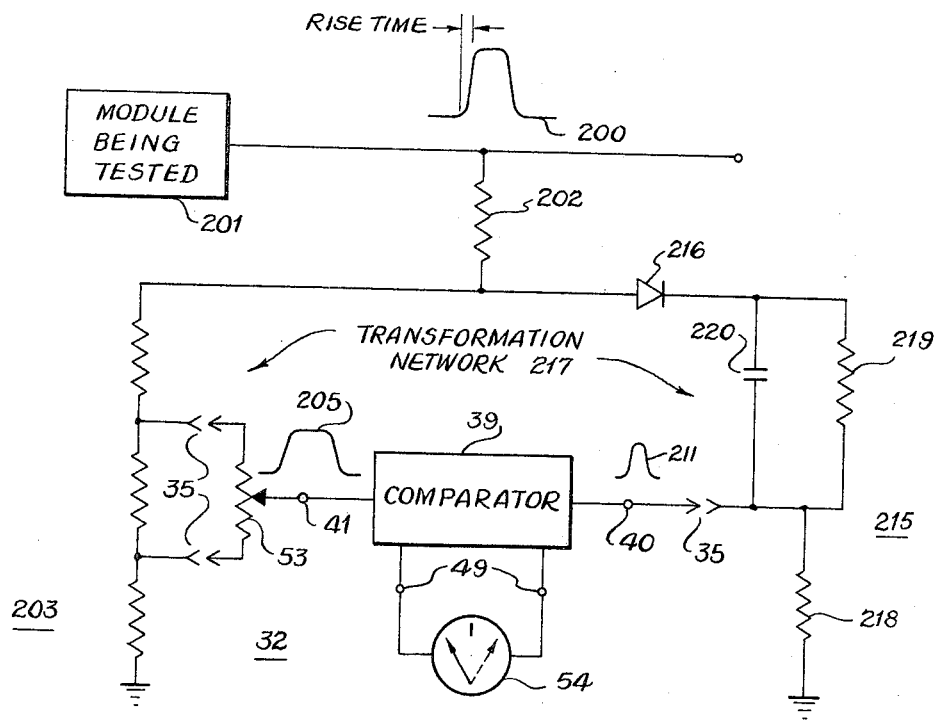

FIG. 15 discloses another transformation network employed in measuring the rise time of a waveform.

Figure 16:
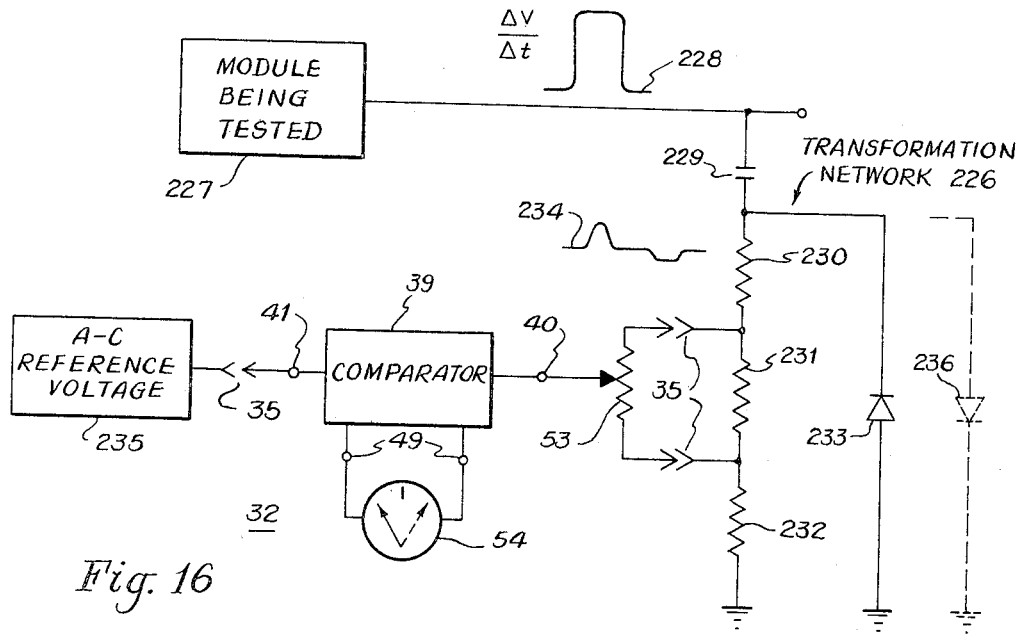

FIG. 16 illustrates a transformation network utilized in the measurement of the rate of rise or decay of a waveform.

Figure 17:
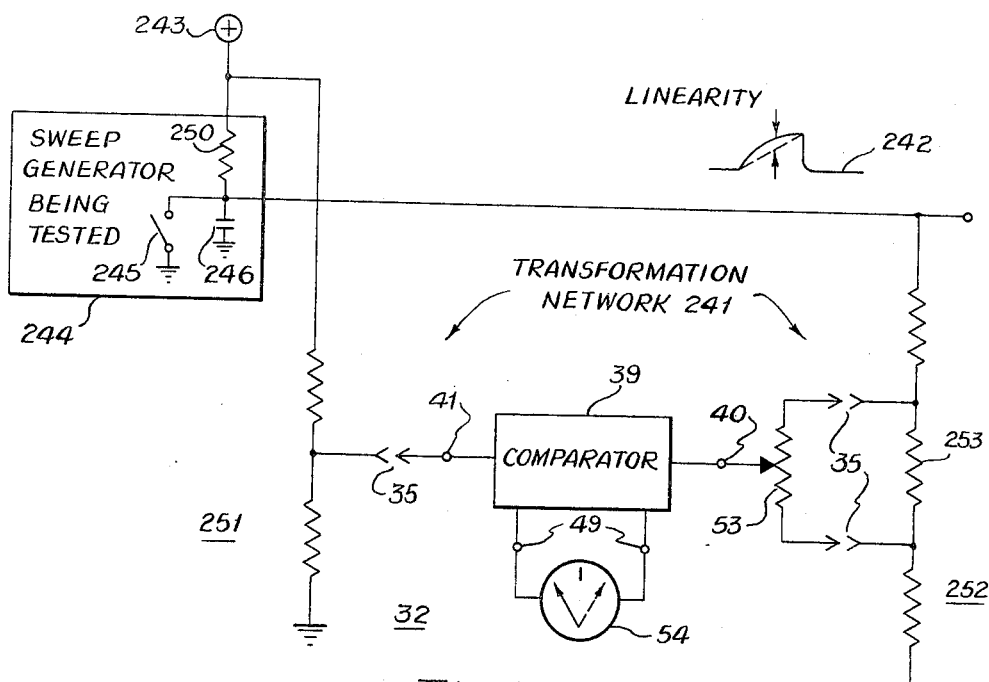

FIG. 17 includes a transformation network that can be employed in the measurement of sweep linearity.

FIG. 18 discloses a first transformation network for the measurement of frequency.

FIG. 18A contains voltage-frequency curves used in explaining the operation of the arrangement in FIG. 18.

FIG. 19 illustrates a second transformation network used in the measurement of frequency.

FIG. 19A comprises voltage-frequency curves utilized in the description of the configuration in FIG. 19.

Figure 20:
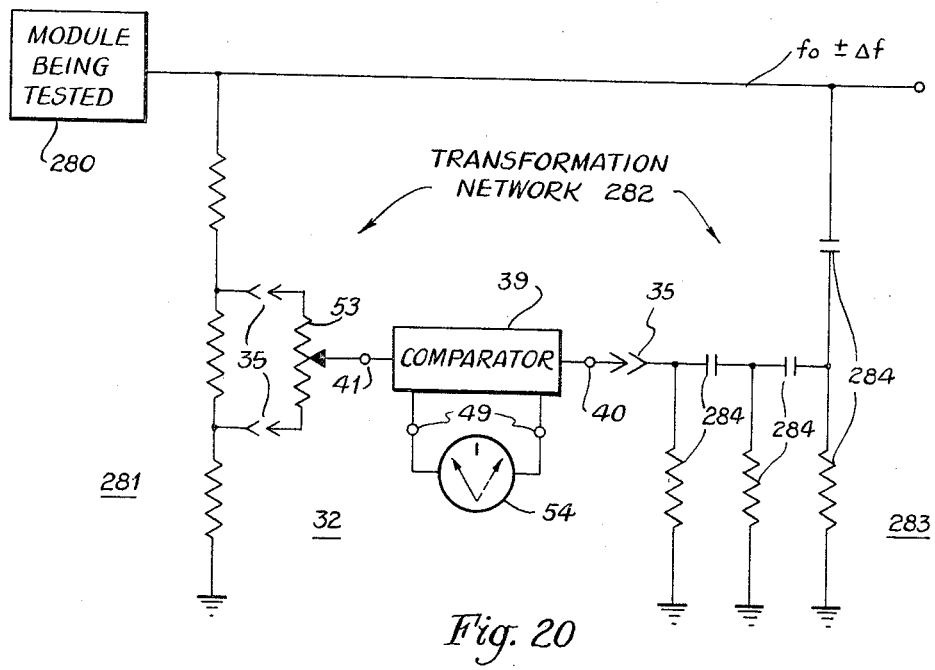

FIG. 20 shows a third transformation network that can be employed in the measurement of frequency.

Figure 20A:
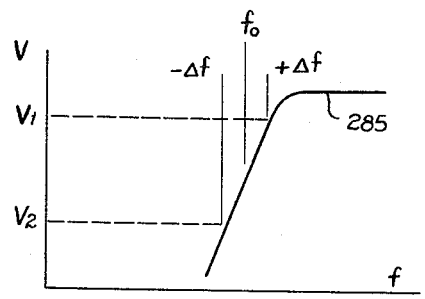

FIG. 20A includes voltage-frequency curves that assist in the explanation of the structure of FIG. 20.

Figure 21:
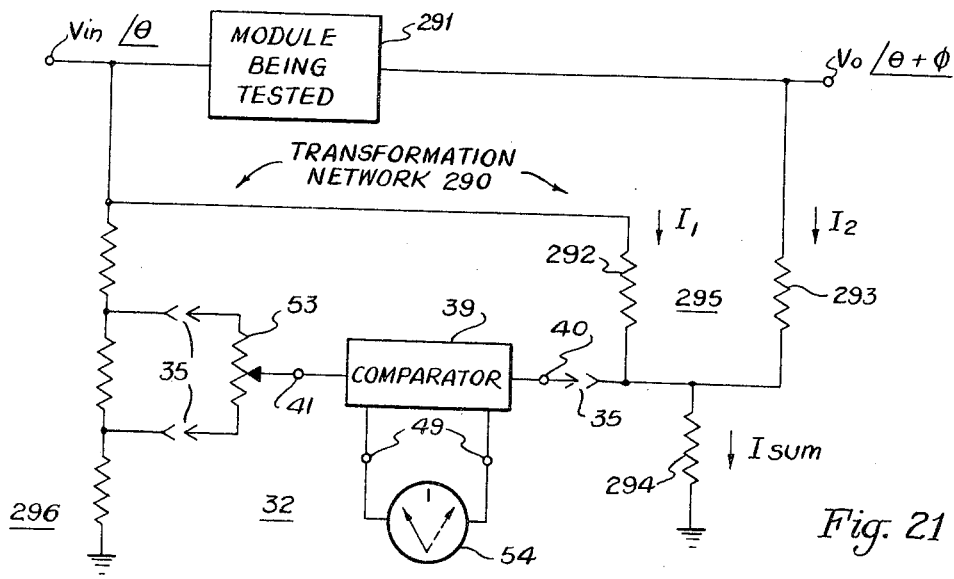

FIG. 21 illustrates a transformation network for the measurement of phase shift.

Figure 21A:
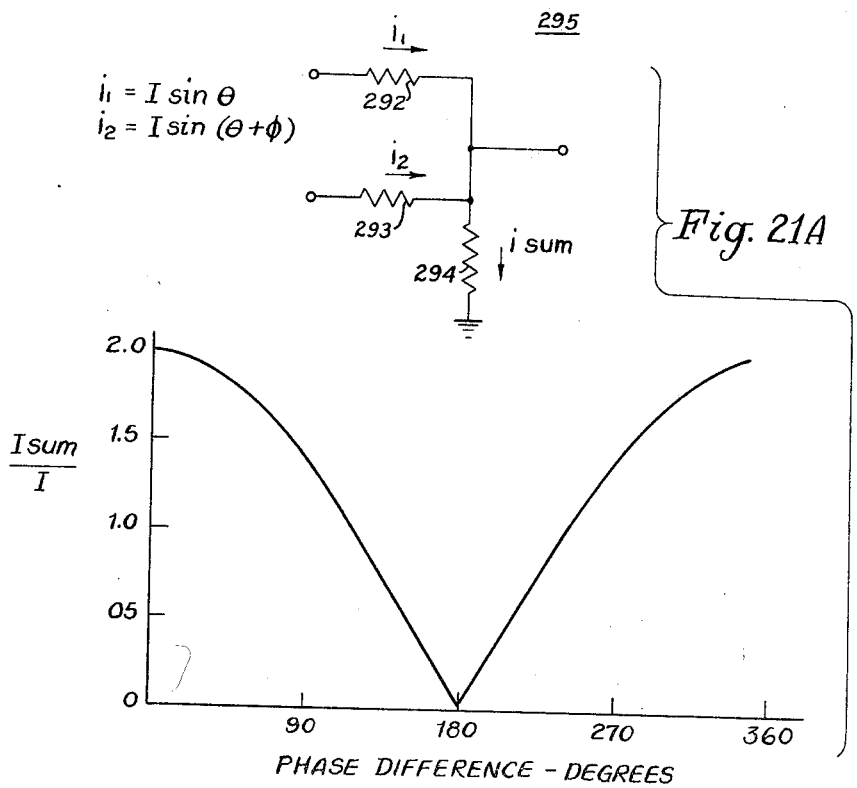

FIG. 21A contains a summing network and a curve of a relationship that is useful in explaining the function of the transformation network in FIG. 21.

Figure 22:
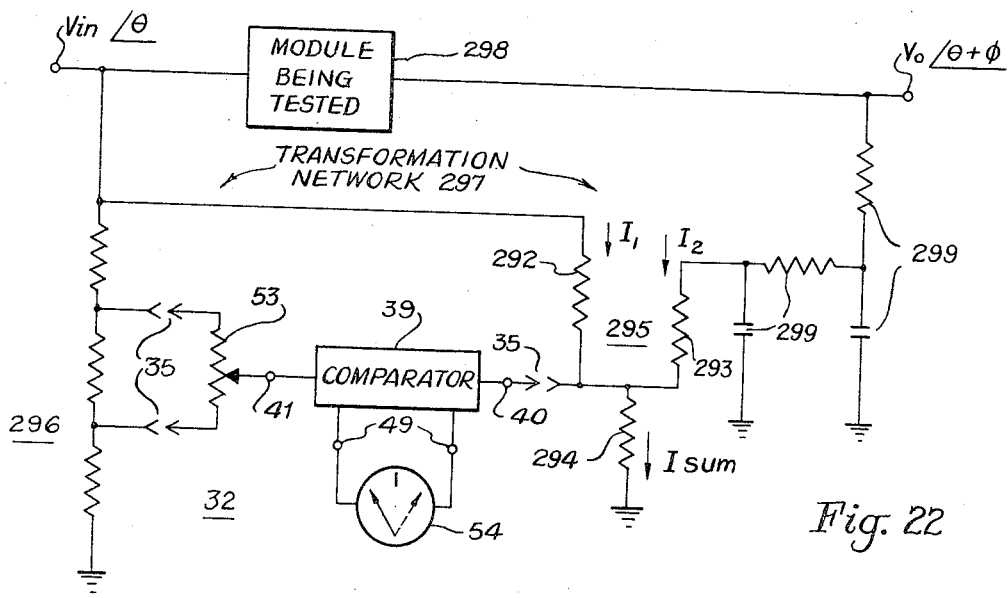

FIG. 22 presents another transformation network used in measuring phase shift.

Figure 22A:
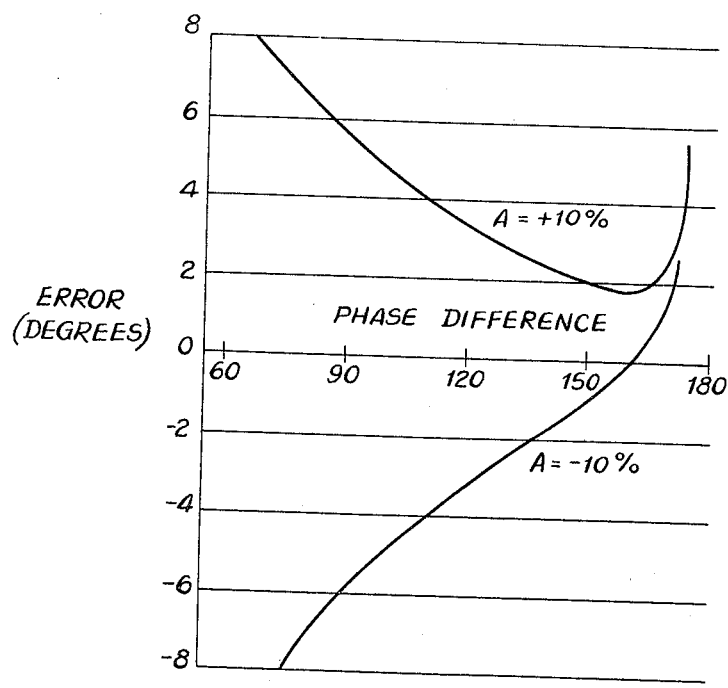

FIG. 22A is composed of phase difference versus error curves which are used in describing FIG. 22.

Figure 23B:
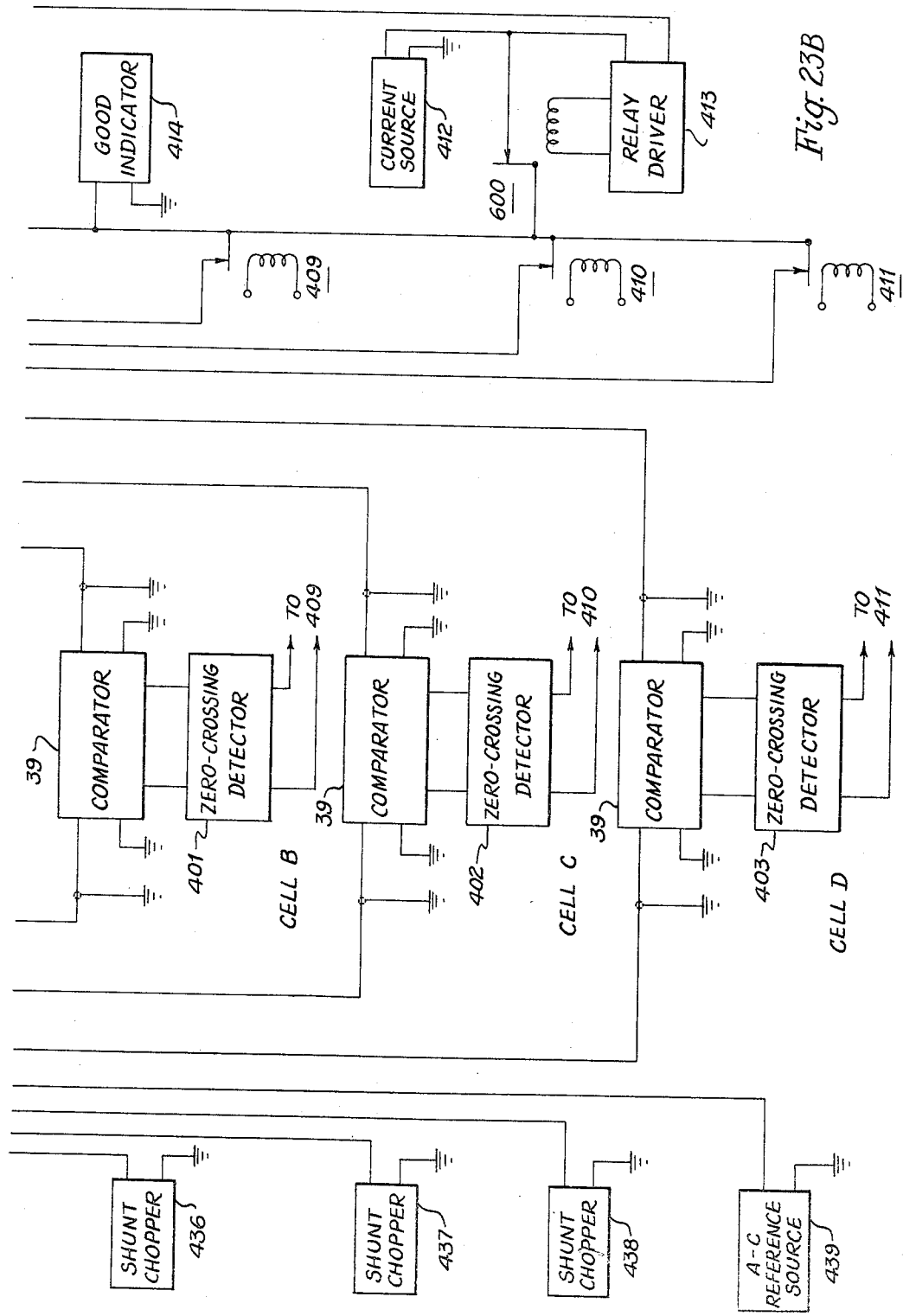

FIG. 23 is a block diagram showing the manner in which FIGS. 23A and 23B are assembled.

Figure 2:
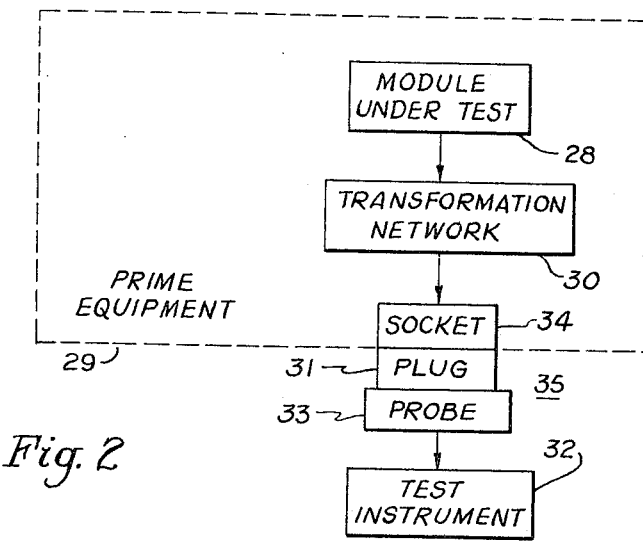
FIG. 2 shows a block diagram of a fault isolation system constructed in accordance with the principles of the present invention.

FIGS. 23A and 23B, considered together, comprise a four-cell test instrument that can be utilized in the system in FIG. 2.

Figure 24:
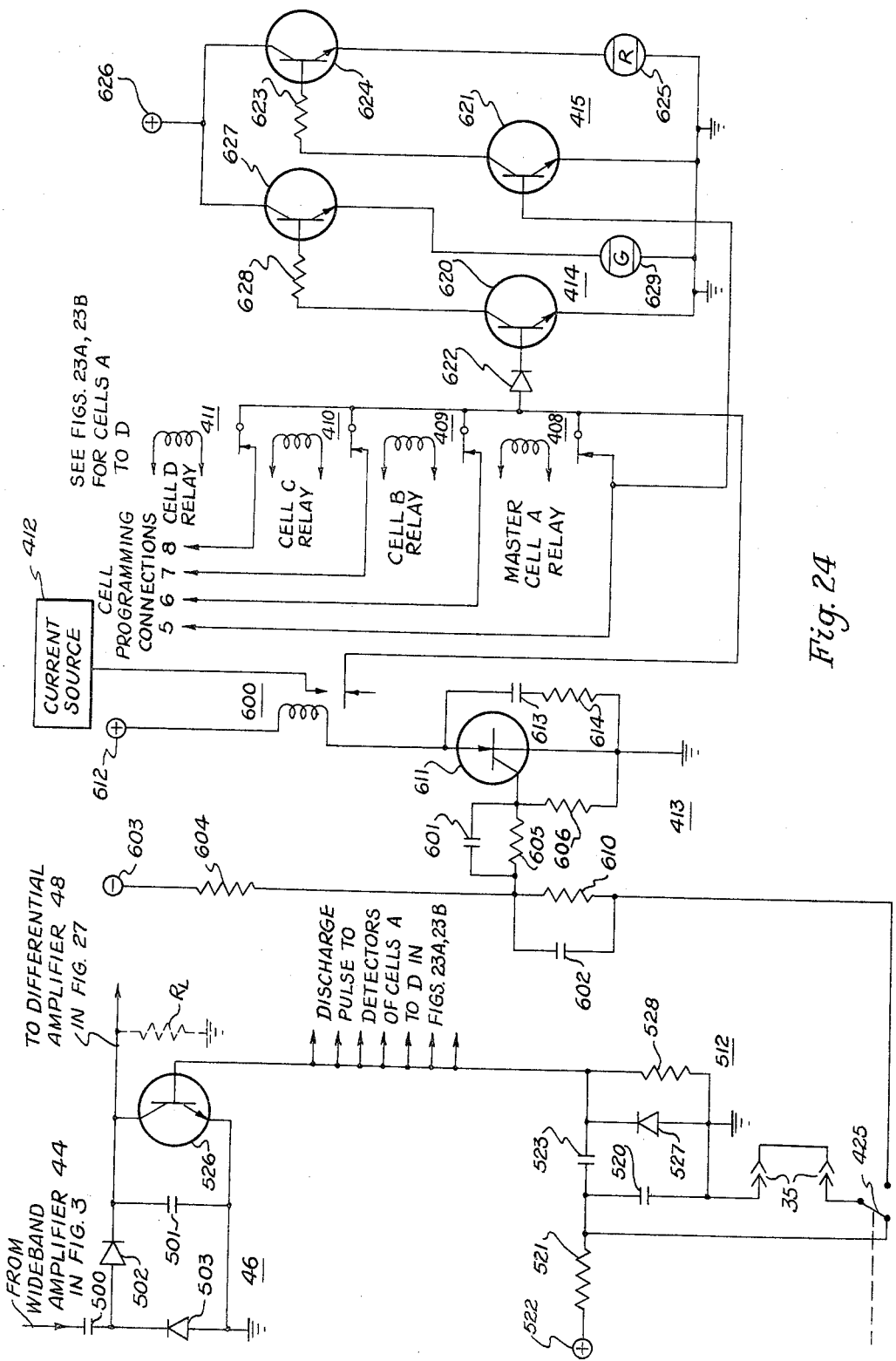

FIG. 24 illustrates a peak-to-peak detector, a discharge circuit, and a circuit of the good and bad indicators employed in the four-cell test instrument in FIGS. 23A and 23B and in the one-cell instrument in FIG. 5.

FIGS. 25A to 25C are waveforms employed in the explanation of the three possible test conditions with the embodiments of the test-instruments using a zero-crossing detector.

FIGS. 26A to 26C are waveforms used in explaining the function of the detector discharge circuit in FIG. 24.

Figure 27:
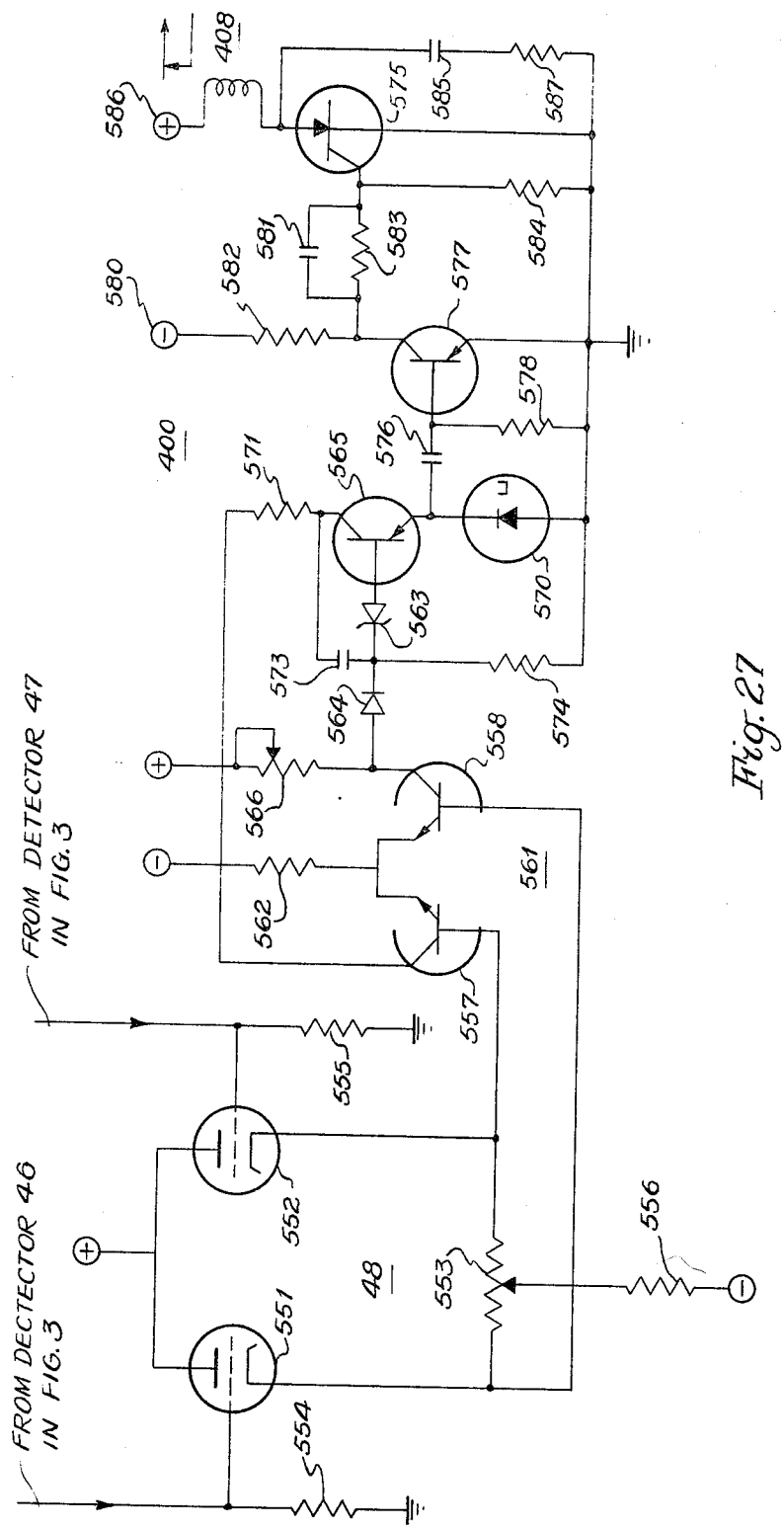

FIG. 27 contains a circuit diagram of the differential amplifier and zero-crossing detector used in each cell of the four-cell test instrument in FIGS. 23A and 23B in the one-cell instrument in FIG. 5.

FIG. 28 is an arrangement used in presenting a typical operation of the four-cell test instrument in FIGS. 23A and 23B.

Figure 28A:
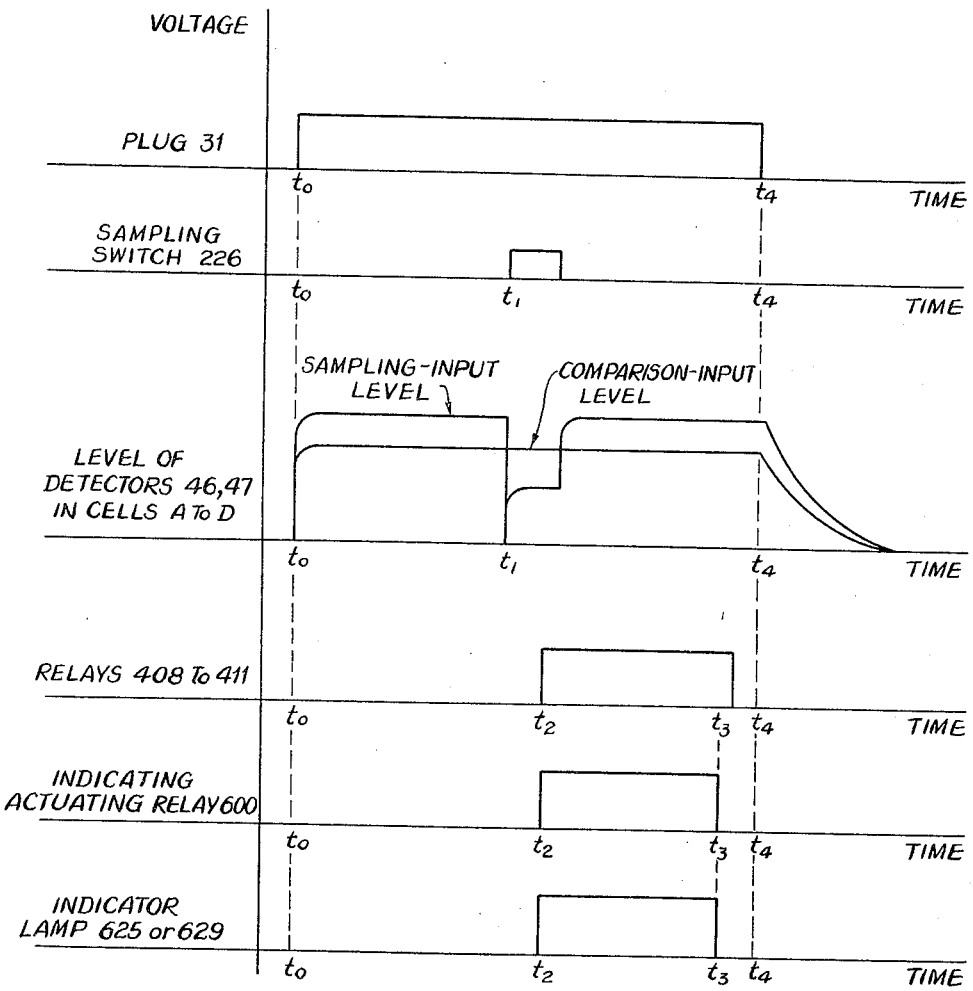

FIG. 28A are waveforms employed in explaining a typical operation of the four-cell test instrument in FIGS. 23A and 23B.

Figure 29:
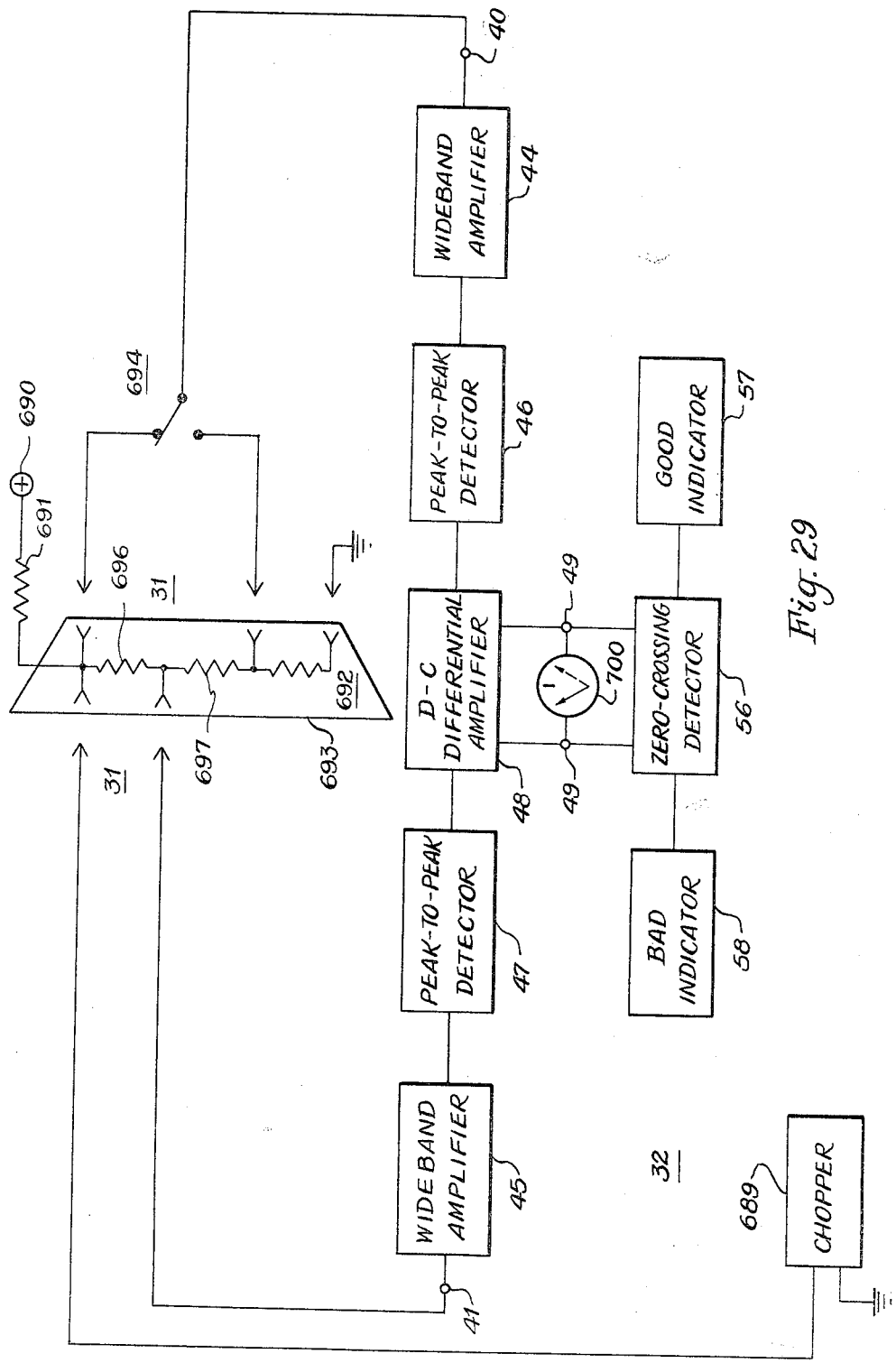

FIG. 29 shows a self-test arrangement for a one-cell test instrument.

Figure 30:
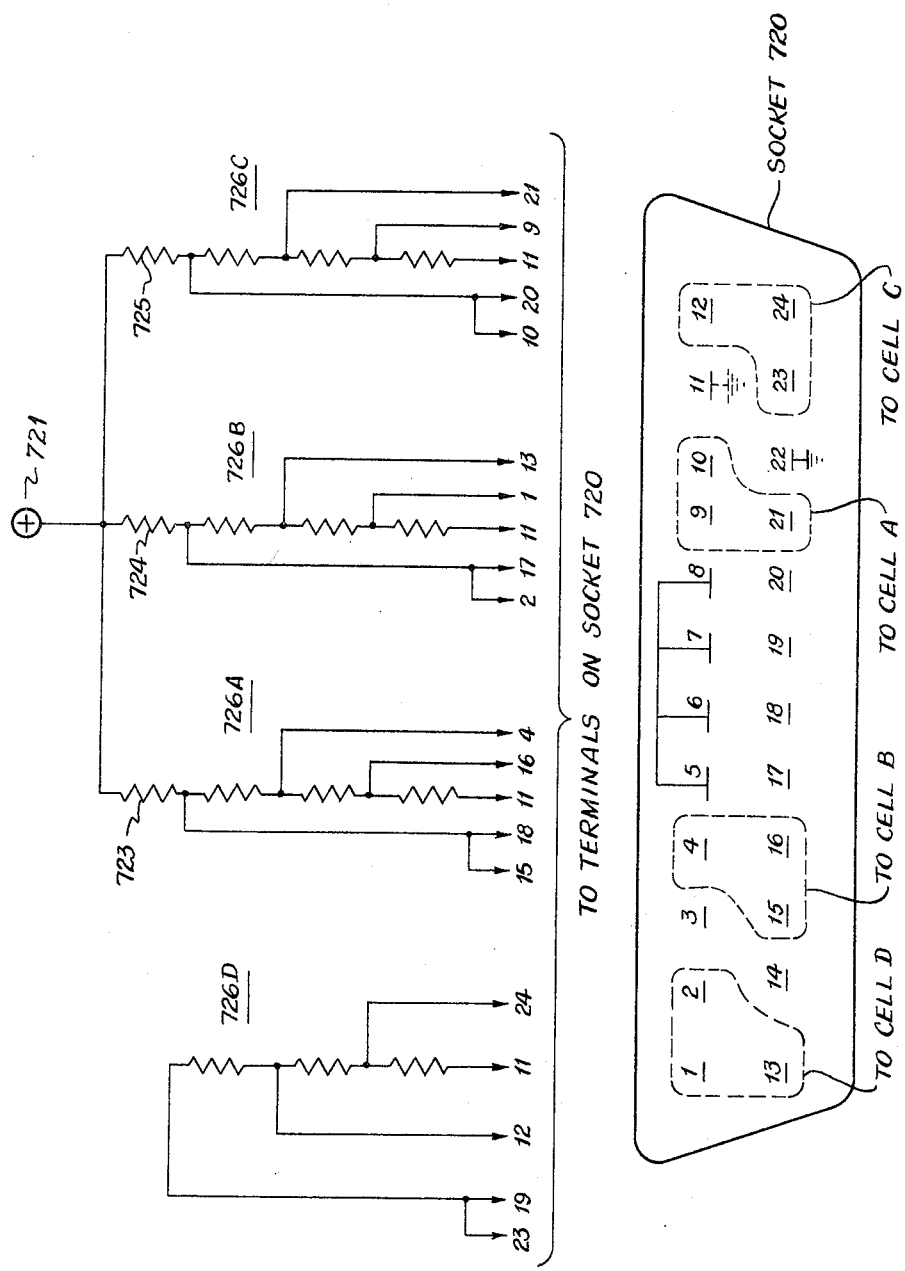

FIG. 30 contains the circuits used with the self-test arrangement for the four-cell test instrument in FIGS. 23A and 23B.

Figure 31:
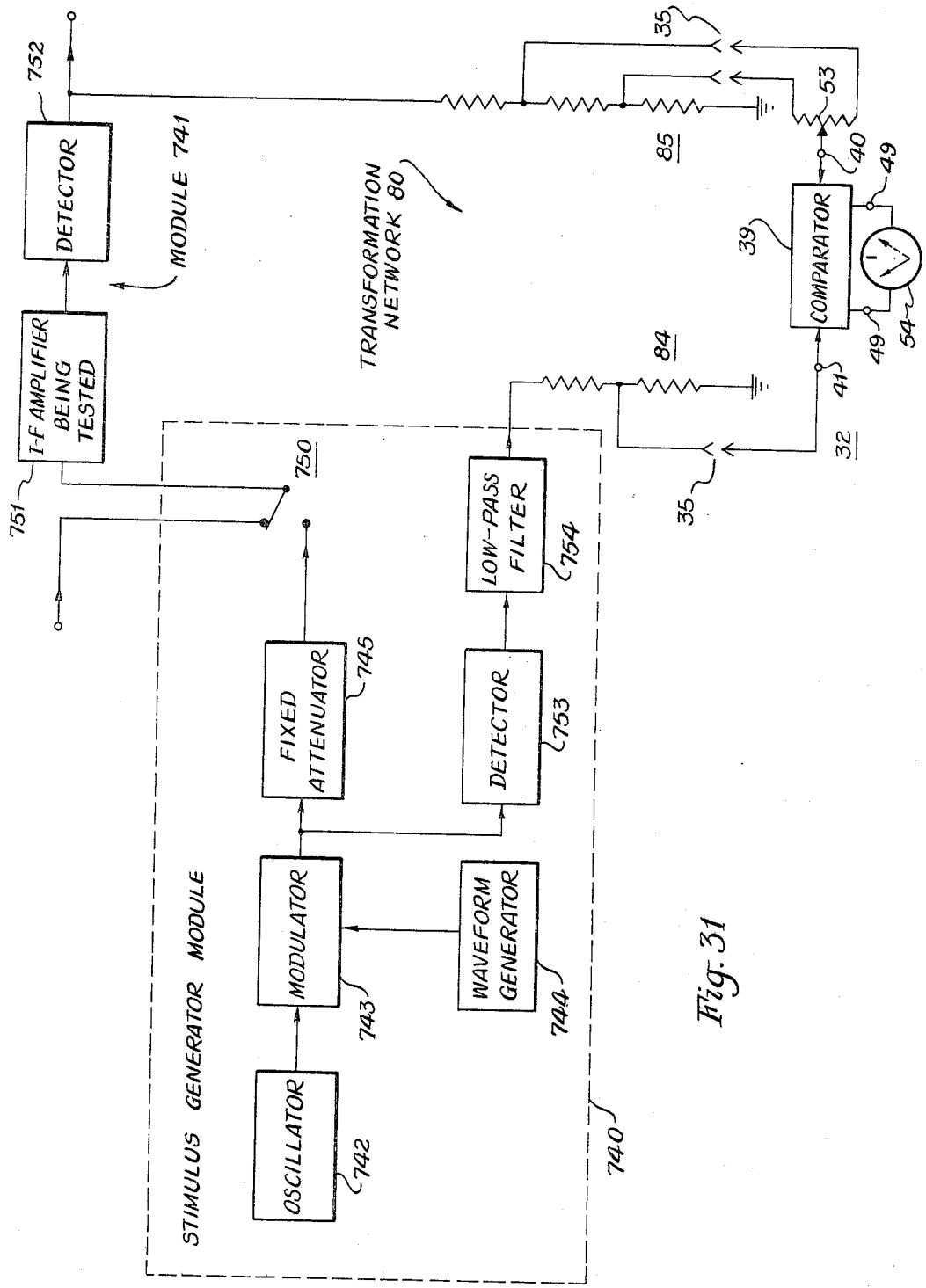

FIG. 31 illustrates an arrangement for inserting a test signal into a module under test.

Figure 32:
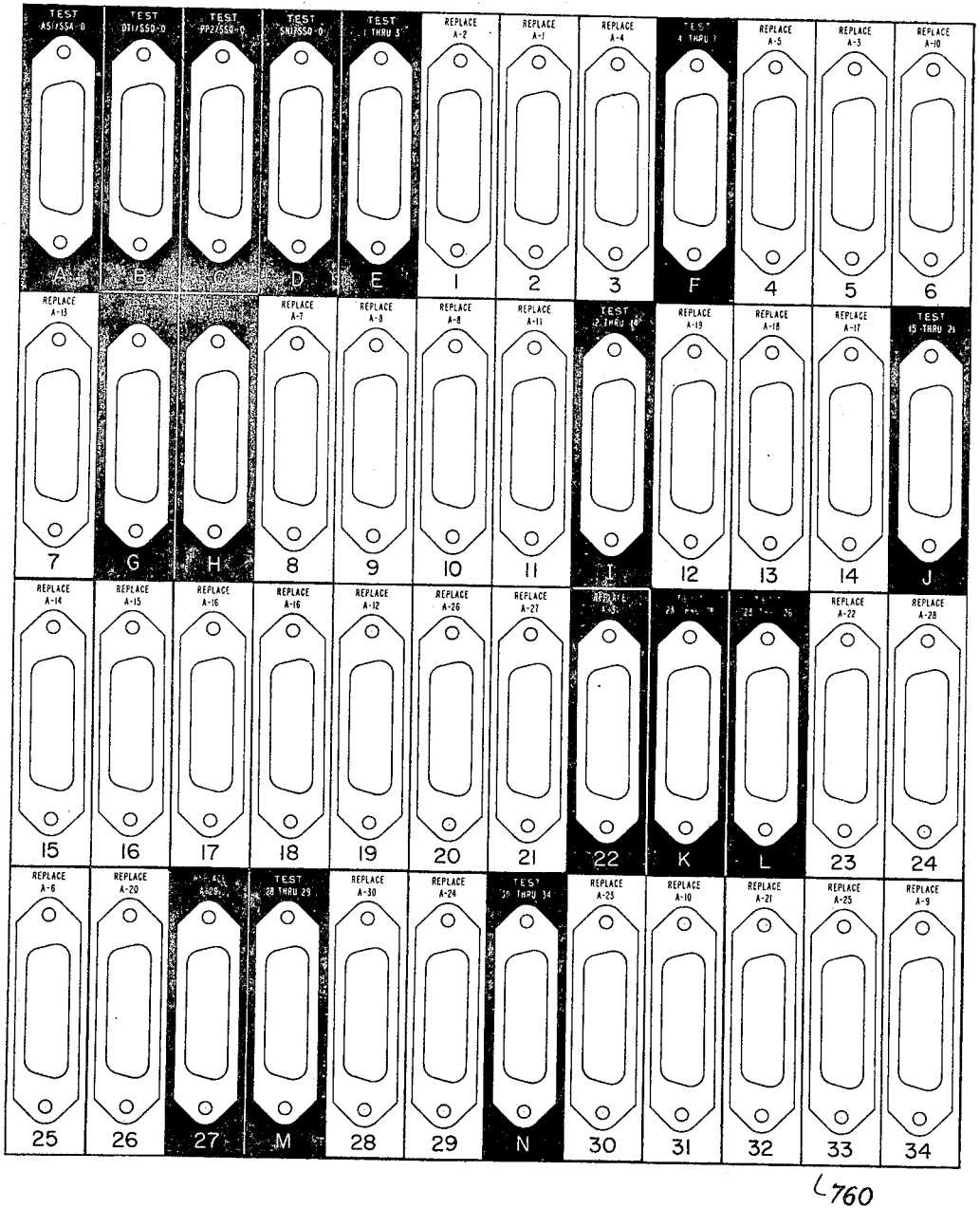

FIG. 32 presents one configuration of test sockets employed in providing a programmed sequence of tests performed on the prime equipment.

Figures 33, 33A:
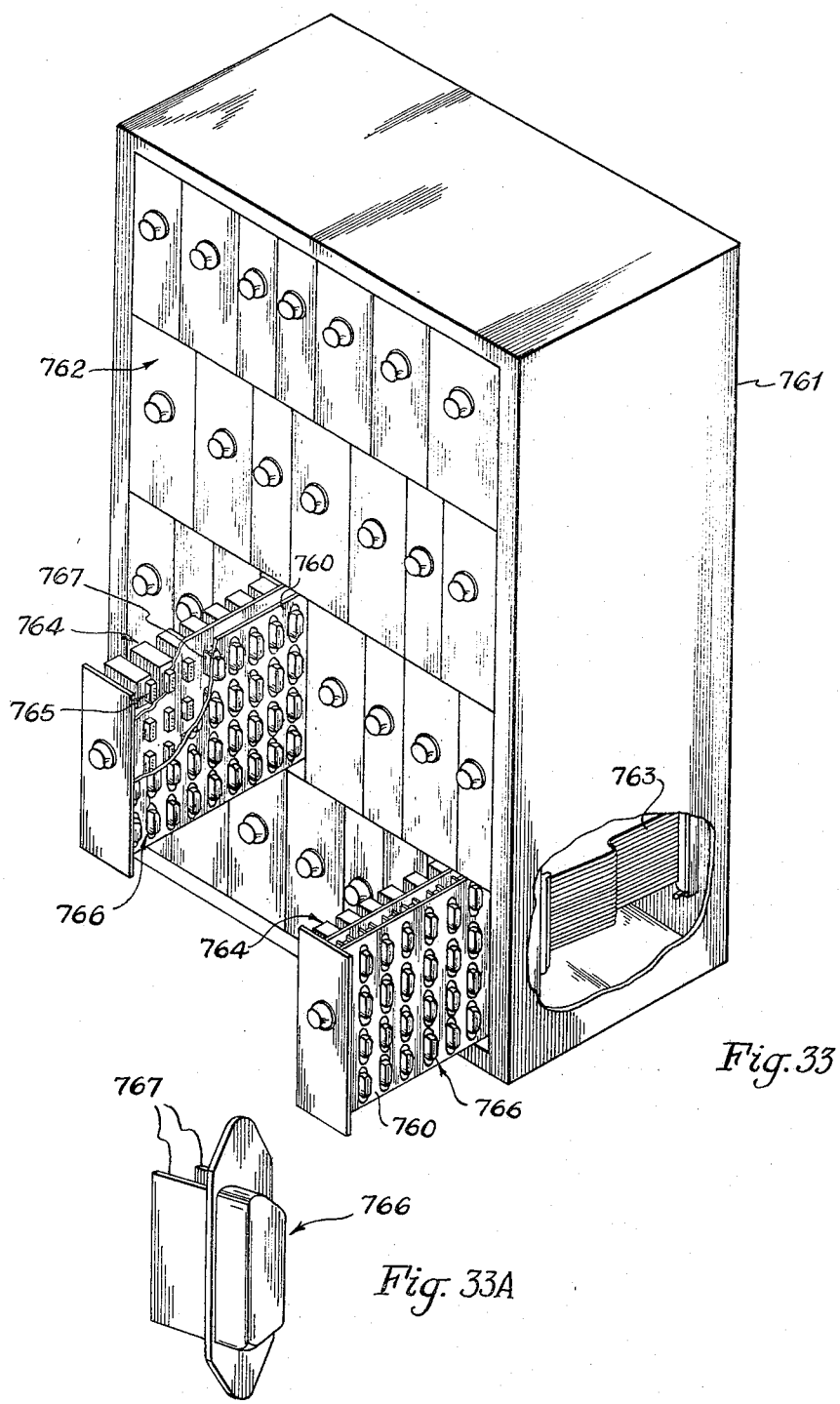

FIG. 33 discloses a recommended lay-out for the prime equipment under test.

FIG. 33A is a detail of FIG. 33, showing a test socket and printed circuit board.

A fault isolation system, constructed in accordance with the present invention, can be used to determine whether the performance of each module in the equipment under test is within the limits required for the correct functioning of the equipment. For simplicity and speed of operation, the system permits the measurements to be made without reference to technical manuals, schematic or block diagrams, trouble-shooting charts, waveform drawings, etc, even though the operator is not familiar with the equipment being tested. The information, normally obtained from these sources, is designed into a transformation network. This information includes the selection of a characteristic of the module's output signal (amplitude, repetition rate, pulse width, pulse rise time or decay, etc.), and the setting of the limits of the test based on the permissible limits of the characteristic being measured.

Figure 1:
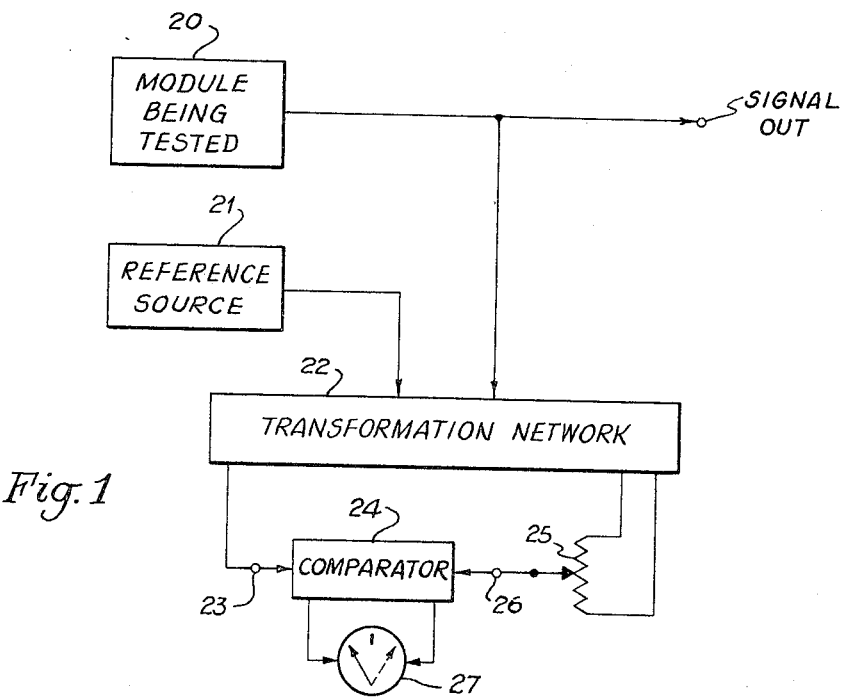

With reference to FIG. 1, a chosen characteristic of the output signal of module 20 is evaluated in terms of the signal provided by reference source 21. One of these signals is transformed by transformation network 22 to a comparison signal and the other to a pair of sampling signals. The relation between these signals is such that the magnitude of the comparison signal will be equal to or lie between those of the sampling signals only when the characteristic of the output signal lies within acceptable design limits.

The comparison signal is applied to terminal 23 of comparator 24, while a signal, derived from the sampling signals by means of potentiometer 25, is applied to the input terminal 26 of the comparator. In this way, the potentiometer, comparator and null-indicator 27 are used to determine whether the magnitude of the comparison signal lies between the magnitudes of the sampling signals. Preferably, the comparator is of a type that will compare a chosen property of the waveforms of two signals even when the waveforms are dissimilar in shape. Because the comparator is insensitive to the shape of the waveforms being compared, the transformation networks may provide comparison and sampling signals that differ in shape and phase. This permits a wide variety of characteristics to be measured with the test instruments described below.

In a practical example, one may desire to know whether the magnitude of the output signal of module 20 is within acceptable design limits, say 50 to 100 volts. The value of certain components of network 22 are then selected so that a comparison signal of, say, 15 volts is derived from source 21 and is applied to input terminal 23. The values of other components of network 22 are selected to provide a pair of sampling signals that are a function of the output signal of module 20. Each of the sampling signals is applied to a respective end of potentiometer 25, and the arm of the potentiometer applies a signal to input terminal 26. The relation between the comparison signal and the sampling signals is such that when the magnitude of the output signal is at its lower design limit and the arm of potentiometer 25 is at its extreme upper position, a signal of 15 volts is applied to terminal 26, and when the output signal is at its upper design limit and the arm of the potentiometer is on its extreme lower position, a signal of 15 volts is applied to terminal 26.

Now with the values indicated, when the output of module 20 falls below 50 volts, the voltage appearing at the upper extreme of potentiometer 25 will be less than 15 volts and a null can not be obtained on indicator 27 as potentiometer 25 is varied over its range. Likewise, when the output of the module rises above 100 volts, the voltage developed at the lower extreme of the potentiometer will be more than 15 volts and a null can not be obtained on the indicator. Thus, the range of voltages derived from potentiometer 25 will permit the output of comparator 24 to display a null on indicator 27 only when the voltage of the output signal of module 20 is between acceptable design limits.

However, the purpose is not to find a nulling point but to determine whether indicator 27 will pass through a null as potentiometer 25 is varied over its range. A single pole, double throw switch could, therefore, be substituted for the potentiometer and the result would be the same. (See FIG. 7.) In this arrangement when the output signal is at its lower design limit and the arm of the switch is in its upper position, a signal minutely above 15 volts, say 0.2% above, is applied to input terminal 26; and when the output signal is at its upper design limit and the arm of the switch is in its lower position a signal minutely below 15 volts is applied to the same terminal. In operation, it is not necessary at any time to have a voltage on terminal 26 equal to that on 23. When the performance of the circuit being tested is within its design limits, it is only necessary that the voltage on terminal 23 lie between the voltages applied to terminal 26 as the switch is moved from one position to the other. (All values are given by way of illustration only.)

It will be apparent that instead of the arrangements just described, the output of source 21 could be converted to a first and second sampling signal, each impressed on a respective end of potentiometer 25, and the output of module 20 could be converted to the comparison signal impressed on terminal 23. The operation of this arrangement is in essence the same as those presented above, except that in general when the output of the module is at its upper design limit a null will be displayed on indicator 27 when the arm of the potentiometer is at its upper extreme position; and when the output of the module is at its lower design limit, a null will be displayed when the arm of the potentiometer is at its extreme lower position.

It will also be apparent that a separate reference source 21 may not be required; in some cases the output of module 20 can be converted by transformation network 22 to a "reference signal."

With reference to FIG. 2, module 28 in prime equipment 29 is under test. The output signal of the module is impressed on transformation network 30, which converts selected characteristics of this signal to a pair of sampling signals and a comparison signal. Each signal is a function of one or more characteristics.

After the plug 31 of probe 33 is inserted into test socket 34, the sampling and comparison signals are applied to test instrument 32, which uses the signals to indicate whether module 28 is performing within acceptable design limits and whether a valid test has been performed. (The plug and socket are designated as connector 35.)

More than one transformation network 30 could be connected to socket 34 to test, simultaneously, more than one characteristic of a module in prime equipment 29, and to indicate whether a valid test has been performed. The test sockets 34 are arranged on a panel in prime equipment 29 to program a sequence of tests. Thus, an untrained technician, who follows the sequence of sockets into which probe 33 is to be inserted, can check the most complex electronic equipment without understanding the circuits being tested or the type of tests being performed.

It should be observed that socket 34 is not just a convenient terminus for test points, but, together with transformation network 30, supplies a test programming function as well. They program the test limits, the kind of measurement to be made, and the interconnections of test instrument 32. Conversely, the plug can program the prime equipment to condition it for a particular test. The significance of these statements will be more fully appreciated from the description presented below.

*One-cell test instruments (FIGS. 3 to 5).*—The transformation networks, presented below, provide the versatility that permits this system to measure a variety of characteristics of an electrical signal with an instrument that is essentially a device for comparing a selected characteristic of a pair of waveforms even when the waveforms have dissimilar shapes.

One embodiment of the comparing means used in test instrument 32 (FIG. 4) comprises comparator 39, illustrated in FIG. 3. Here input terminal 40 is connected to a wide-band amplifier 44, which drives peak-to-peak detector 46, while input terminal 41 is connected to wideband amplifier 45, which drives the peak-to-peak detector 47. The detector outputs are applied to D-C differential amplifier 48 to develop an output signal, appearing on terminals 49.

One should observe that comparator 39 is insensitive to the phase difference between and the shapes of the waveforms of the signals applied to terminals 40 and 41. As one example, the peak-to-peak voltage of an A-C signal applied to 40 may be compared with the peak-to-peak voltage of another type of A-C signal applied to 41, and the comparison will be unaffected by variations in waveform or phase. Again, since comparator 39 operates on peak-to-peak amplitudes, the input signals need not be similar signals, and the output on terminals 49 is independent of the phase relationship between the two.

One embodiment of instrument 32 (FIG. 4) comprises a plug 31 having one pin connected to terminal 41 and other pins connected across potentiometer 53, which is located in probe 33. The arm of the potentiometer is tied to terminal 40, and null-indicator 54 is positioned across the output terminals 49.

In a second embodiment (FIG. 5), certain pins of plug 31 are tied to the fixed contacts of switch 55 in probe 33, and the arm of the switch is tied to input terminal 40. The switch can be either electrically driven at a low sampling rate, or hand-operated by means of a push button. Another pin of the plug is connected to the input terminal 41, and a zero-crossing detector 56 is located across the output terminals of comparator 39. The detector controls good indicator 57 and bad indicator 58 as set forth in detail later. (See FIGS. 24, 27.)

The operation of these embodiments of instrument 32 will be considered in connection with the transformation network 80 used in the measurement of amplification and shown in FIGS. 6 and 7.

*Transformation networks (FIGS. 6 to 22).*—The transformation networks, by converting a characteristic of a signal under test to a voltage that may be interpreted by instrument 32, permits the fault location system (FIG. 2) to use a single instrument to test a multiplicity of modules that provide diverse signals having a wide variety of characteristics. Again, because of the information that is designed into the transformation networks, the technician may test this wide variety of characteristics without appreciating the nature or the sophistication of the tests being performed. The transformation network components are chosen to minimize their loading of the module being tested.

*Amplification (FIGS. 6 and 7).*—Amplification is easily measured dynamically. The method of measurement is independent of the type of signal being amplified, so long as it is within the frequency range of the test instrument and is not aperiodic in nature. For this measurement, both inputs to the comparator are derived from the amplifier. A fraction of the input signal is used as the comparison signal, while the signal present at the output of the amplifier is used as the basis of the sampling signals. The transformation network includes a resistive, voltage divider or pair of voltage dividers.

An arrangement for measuring amplification with the first embodiment of test instrument 32 is shown in FIG. 6. Here transformation network 80 is used to measure the amplification of a signal applied to amplifier module 81. The functional relation between the transformation network, module, connector 35 and instrument 32 is the same as that shown in FIG. 2. Connector 83 permits module 81 to be easily removed from the prime equipment 29 when the former fails to meet desired operating standards. It will be understood that connector 83 could be used, although not shown, in conjunction with the modules and transformation networks described later.

Transformation network 80 comprises voltage dividers 84 and 85. Since the value of potentiometer 53 is selected to be several times larger than the value of resistor 86 in the latter divider, the potentiometer may be neglected for the purposes of the computation below. (It should be noted that potentiometer 53 is always several times larger than the associated resistor in the networks, described later, across which the potentiometer is positioned.) Sampling divider 85 and the potentiometer are used to apply a fraction of the output signal of amplifier 81 to input terminal 40, while comparison divider 84 minimizes the loading on the input of the amplifier, and also, if necessary, reduces the input signal of the amplifier to the level required by comparator 39.

It should be noted that one of the functions performed by the input signal is essentially the same as the signal provided by reference source 21 (FIG. 1). Thus, the input signal, when applied to comparison divider 84, is in essence a "reference signal." Deriving the "reference signal" from the signal being evaluated makes it possible to eliminate the effects of one variable so that the setting of potentiometer 53 at which a null is obtained on indicator 54 is a function of a second variable only. This concept is used in many of the transformation networks which will be described later. In the present example, use of the input signal as a reference permits the measurement of amplification independently of signal amplitude.

If the amplification of amplifier 81 has dropped to the minimum acceptable value, a larger fraction of the amplifier output voltage will be needed to equalize the comparison signal applied to input terminal 41 and derived from the input to 81. If the values of the resistors in divider 85 are chosen so that the arm of potentiometer 53 is in its extreme upward position when this occurs, a null can be obtained for the lowest acceptable limit of amplification, but not if the amplification drops any lower. Similarly, if the amplification is at its highest acceptable value, the output voltage of divider 85 must be a smaller fraction of the total, and a null can be obtained at the most downward position of the arm of potentiometer 53. Higher amplification will result in a voltage on terminal 40 that is too high to be equalized within the range of the potentiometer. When a null is not attained on null-indicator 54, then amplifier 81 is not performing within acceptable limits and should be replaced. Thus, the amplifier is acceptable only if the needle on indicator 54 passes through the zero or null position as the arm of potentiometer 53 is varied between its upper and lower limits.

As a more detailed example, assume that the performance of amplifier 81 is acceptable provided its amplification is between 9 and 11. The input signal to this amplifier is 10 times the maximum signal level required by comparator 39. Thus, divider 84 must reduce this signal by a factor of 10 to provide the comparison signal on terminal 41. To match this signal at terminal 40, divider 85 must attenuate the amplifier output by a factor of 90 when the amplification is minimum and by a factor of 110 when the amplification is maximum. If divider 85 is designed so that its output is 1/90 of its input when the arm of potentiometer 53 is in its uppermost position, and 1/110 of its input when the arm is in its most downward position, the potentiometer can deliver any fraction of the amplifier output voltage between 1/90 and 1/110. This permits equalizing the inputs to comparator 39 for any amplification between 9 and 11.

The limits to which the amplification is tested can be changed by changing the values of the resistors in divider 85 and efficaciously the voltage range of potentiometer 53.

In the typical operation set forth just above, if a null is obtained at some setting of potentiometer 53, the module under test is considered good. However, the object is not to find a nulling point, but to determine whether indicator 54 will pass through null when the arm of the potentiometer is moved from one extreme to the other. A single-pole, double-throw switch could be substituted for the potentiometer and the effect would be the same. An indication of acceptable performance would be obtained when the needle of indicator 54 passes through zero as the switch is alternately switched across resistor 86.

Since it is necessary only to determine whether the output of comparator 39 (FIG. 3) passes through zero, indicator 54 has been replaced in FIGS. 5 and 7 by a zero-crossing detector 56. In operation, when switch 55 connects input terminal 40 alternately to the ends of resistor 86, the detector excites good indicator 57, if the output of comparator 39 goes through zero, or bad indicator 58 if it does not.

The good indicator 57 and the bad indicator 58 are substantially identical to the good and bad indicators 414 and 415, respectively, which are shown in detail in FIG. 24 and are described in connection with the four-cell test instrument below. Likewise, the zero-crossing detector 56 is substantially the same as detector 400 shown in detail in FIG. 27.

Since the "good-bad" indication is independent of the relative phase of the two input signals to comparator 39 the test for amplification is not affected by the phase shift of amplifier 81, and is the same whether the amplifier inverts the signal or not. If amplification of the circuit is less than unity, such as occurs in a cathode follower, the amplifier input must be attenuated more than the output, but in other respects the test is the same.

In many cases, the maximum amplification is unimportant; the amplifier is acceptable provided its amplification is greater than a specified minimum value. In this case the amplification test can be made to a single-ended limit by eliminating the lower resistor in divider 85 and grounding the lower end of resistor 86. The resistance values are then chosen so that the maximum output of potentiometer 53 is just sufficient to equalize the inputs to comparator 39 when the amplification of the circuit under test is at its minimum acceptable value. The amplifier 81 will then test "good" only when its amplification is equal to or higher than this value. This, in effect, is a measurement between two limits, where the lower limit is the minimum specified value and the upper limit is infinity.

It will be apparent, as the discussion proceeds, that the approach just described for determining when the limit of a characteristic is above an acceptable value can be used with many of the transformation networks described below.

*Voltage amplitude (FIGS. 8 to 10).*—A voltage may be measured by comparing its amplitude with that of a reference voltage. In FIG. 8, the voltage to be measured is obtained from the output of module 110, and is reduced by a sampling divider, composed of resistors 111, 113 and 118, in transformation network 112 to a level that is acceptable to comparator 39. The sampling signals appear, one at each end of resistor 113. The resistor is positioned across potentiometer 53, and the arm of 53 is tied to input terminal 40, while the A-C reference source 114, contained in instrument 32, applies a comparison signal of known voltage to input terminal 41, either directly by means of a jumper wire, as shown in FIG. 8, or through an attenuator.

The values of resistors 111, 113 and 118 are chosen in such a manner that a null will be obtained on indicator 54, as potentiometer 53 is varied over its range, only when the voltage being tested is within acceptable design limits.

By adding shunt chopper 115 to instrument 32, it becomes possible to extend the measurement range of 32 down to D-C voltages. When a D-C measurement is to be made, dotted lead 116 is connected as shown, thereby permitting the D-C voltage developed at the top of resistor 118 to be converted into a pulsating D-C voltage having a peak-to-peak amplitude equal to the level of the D-C voltage.

An A-C voltage, obtained from the output of module 110, can be measured in the presence of D-C by blocking the D-C with a capacitor; and the D-C component of a signal, which contains both A-C and D-C components, can be measured by adding a low-pass filter to transformation network 112.

*Overshoot or droop.*—Pulse amplitudes are measured in the same way as A-C voltages, but special precautions may be required when measuring the amplitude of a pulse or square wave in which overhoot or droop is present. Since comparator 39 is sensitive to changes in peak-to-peak amplitude, it may respond to changes in the overshoot or droop unless the transformation network is designed to prevent this. The extra components required should be added to the transformation network only when changes in overshoot or droop are likely to cause unacceptable errors in the measurement of amplitude.

FIG. 9A illustrates three pulses 121 to 123 of the same amplitude A that would produce different outputs when applied to terminal 40 of comparator 39. The comparator would correctly indicate the amplitude of pulse 121, but would indicate the amplitude plus overshoot in 122 and 123. If the precent overshoot in 122 and 123 are known and constant, a transformation network, comprising a resistive divider, can be used to measure amplitude, provided the resistors are selected to allow for overshoot.

If changes in the overshoot are likely to obscure changes in amplitude, however, the overshoot must be eliminated before the amplitude can be measured. This can be accomplished by transformation network 124 when the latter is incorporated in the schematic diagram in FIG. 9. This network includes an integrator that comprises resistor 125 and capacitor 126. The time constant of the integrator is chosen to eliminate overshoot in the waveform 129 so that its amplitude is proportional to the amplitude of 127 without the overshoot.

As shown in FIG. 10A, the presence of droop in a rectangular waveform 140 also increases the peak-to-peak amplitude relative to amplitude A'. If the precent droop is constant and known or changes by only a small amount relative to the changes in amplitude that is to be measured, a resistive divider will suffice as a transformation network and the presence of droop can be allowed for in the selection of the resistor values.

If droop must be eliminated before the amplitude of a waveform can be measured, transformation network 141 may be used in the manner illustrated in FIG. 10. The low frequency components of waveform 142, appearing at the output of module 143, are eliminated by a differentiator comprising capacitor 144 and divider 145 in transformation network 141. The resistors in the divider are selected to reduce the resulting signal 146, that is independent of droop, to a level that can be compared with the output of source 114.

In operation, the signals provided by modules 128 and 143 in FIGS. 9 and 10, respectively, are within specified design limits when a null is obtained on indicator 54 at some position of potentiometer 53 as it is varied from one extreme to the other.

*Overshoot (FIG. 11).*—When overshoot must be measured, it is usually because it is an undesirable property of the pulse, which is tolerated provided it does not exceed a specified maximum percentage of the pulse amplitude. Overshoot is therefore measured as a percent of waveform amplitude by means of transformation network 150 in FIG. 11.

The output of module 151, represented by waveform 152, has an amplitude A and is impressed on a divided comprising resistors 153 and 154, which is used to reduce the amplitude of 152 to a level that is acceptable to comparator 39. Capacitor 159, positioned across resistor 154, permits the wavefront of waveform 152 to be integrated slightly to eliminate overshoot, so that the amplitude of waveform 158 is not affected by changes in overshoot. Waveform 158 is the comparison signal and is applied to input terminal 41.

The output of module 151 is also impressed on a sampling divider, composed of resistors 155, 156 and 157. The voltages, developed at the top and at the bottom of resistor 156, are each designated as a sampling signal. Each sampling signal has a peak amplitude proportional to the peak amplitude of waveform 152. (Here the peak amplitude of waveform 152 is equal to the amplitude A of 152 plus the overshoot.) From the sampling signals, potentiometer 53, located across resistor 156, derives waveform 160, which is applied to input terminal 40.

The amplitudes of both waveforms 158 and 160 are proportional to the amplitude of 152, but while the amplitude of 160 is a function of overshoot, the amplitude of 158 is not. Changes in the amplitude of waveform 152 will change the peak amplitude of both inputs of comparator 39 by the same percent, and the setting of potentiometer 53, at which a null is obtained on indicator 54, will therefore be a function of overshoot only.

The values of the resistors in the comparison and sampling dividers are selected so that waveform 160 can be adjusted, by means of potentiometer 53, to the magnitude of waveform 158 for any acceptable amount of overshoot from zero to the specified maximum percentage of the amplitude of waveform 152. To accomplish this, maximum output is obtained from potentiometer 53 when there is no overshoot of 152, and minimum output from the potentiometer is obtained when the overshoot reaches its maximum acceptable percentage value. Hence, waveforms 158 and 160 can be equalized to indicate a null on indicator 54 only when the overshoot of waveform 152 is within the specified limits. Overshoot is accordingly measured as a percentage of the amplitude of 152.

*Droop (FIG. 12).*—Droop is measured as a percentage of signal amplitude as illustrated in FIG. 12. Module 170 generates waveform 171, which is applied through a differentiator, comprising capacitor 172 and resistors 173 and 174, in transformation network 175 to ground. The amplitude of waveform 176 thus obtained is proportional to that of waveform 171, but independent of droop. The differentiator time constant must be long enough to make the amplitude of waveform 176 substantially independent of the transition time of waveform 171. Component values 172 to 174 are chosen to minimize the load on the output of module 170.

The output of module 170 (waveform 171) is also applied to a sampling divider that is composed of resistors 177, 178 and 179. The sampling voltages appear, one at each end of resistor 178, and have a magnitude that is proportional to the peak-to-peak amplitude of waveform 171. (Here the peak-to-peak amplitude is equal to the amplitude A of waveform 171 plus the droop.) Potentiometer 53 is positioned across resistor 178 and applies waveform 180, derived from the sampling signals, to input terminal 40.

It is observed that the amplitude of waveform 176 is proportional to the amplitude of waveform 171, while the amplitude of waveform 180 is proportional to the amplitude of waveform 171 and is also a function of the droop.

Hence changes in the amplitude of 171 will change both inputs of comparator 39 by the same percent, and the setting of potentiometer 53, at which a null is obtained on indicator 54, will be a function of droop only.

The values of the resistors in the sampling and comparison dividers are chosen in such a fashion that the outputs of the two dividers can be made equal, by varying potentiometer 53, only when the droop is within prescribed limits. Accordingly, the components of FIG. 12 may, for example, be selected and assigned values whereby comparator 39 will indicate a null on indicator 54 for any amount of droop from zero (maximum output from potentiometer 53) to the specified maximum percentage (minimum output from the potentiometer).

*Pulse width (FIG. 13).*—In FIG. 13, transformation network 185 is used to measure the width of waveform 186, which is generated by module 187. The waveform is applied to sampling divider 188 and waveform 191, having an amplitude dependent upon the amplitude of waveform 186, appears on input terminal 41. Waveform 186 is efficaciously a "reference signal," and develops a sampling signal at each end of resistor 189.

Waveform 186 is also impressed on integrator 190, whose output waveform 194 has a peak amplitude that is proportional to the amplitude and a function of the width of 186. Since the amplitude of waveform 191 is proportional to the amplitude of 186, but independent of width, changes in the amplitude of waveform 186 will change both inputs to the comparator 39 by the same percent.

The time constant of integrator 190 is not critical, provided it is at least as long as the widest waveform to be measured and provided the amplitude of waveform 194 is sensitive to changes in the width of the measured waveform. As the time constant increases, the amplitude of 194 decreases, but the linearity of the measurement and the sensitivity to change in the width of 186 increases. It is advisable, therefore, to make the time constant of 190 as long as possible.

In this figure, transformation network 185 derives a comparison signal (waveform 194) and a pair of sampling signals (represented by 191) all from the output of module 187. The output of module 187 therefore serves as a "reference signal" in addition to furnishing the signal to be evaluated. Under these conditions: the values of the resistors in divider 188 are chosen so that the highest output voltage from potentiometer 53 is equal to the ouput voltage of the integrator 190 when the width of the waveform 186 is at its maximum acceptable limit, and the lowest voltage available from the potentiometer is equal to the output voltage of the integrator when the waveform width is at its minimum acceptable limit. The potentiometer 53 can then be adjusted so that comparator 39 will indicate a balance for any pulse width between the limits chosen. Thus, if a balance can be obtained on null-indicator 54 within the potentiometer range, the performance of module 187 is acceptable.

Although rise time and amplitude are usually the important properties of pulses used as triggers, in some applications the width of the trigger pulse must also be less than a specified maximum to prevent its interfering with the proper operation of the triggered circuit. In such an application, three tests might be used to evaluate the pulse, the first to check the amplitude, the second to check the rise time, and the third to check the width. In the latter test it would be necessary only to determine if the pulse width is less than the prescribed maximum. It is noted that the absence of a pulse (zero pulse width) would be detected by the amplitude or rise time test.

Transformation network 185 can be modified to determine whether the pulse is less than a specified maximum width by omitting resistor 195 and grounding the lower end of 189. Resistors 189 and 196 are chosen so that the highest output voltage from potentiometer 53 is equal to the output voltage of integrator 190 when the width of waveform 186 is the maximum acceptable. Comparator 39 will then indicate a balance for any pulse width equal to or less than this maximum. It will be apparent that many of the other transformation networks described can be similarly modified to determine whether the chosen characteristic is lower than a prescribed maximum value.

*Pulse rise or decay time (FIGS. 14 and 15).*—The transformation network 204 in FIG. 14 can be used to measure rise time; and by reversing the polarization of diode 207 as illustrated by dotted diode 212, the network can be used to measure the decay time of waveform 200.

Pulse waveform 200 is generated by module 201 and is branched through isolation resistor 202 to differentiating network 206 which, in the absence of diode 207, has an output comprising a pair of pulses of opposite polarity, one occurring at the leading and one at the trailing edge cf the waveform. The peak amplitude of the first pulse is proportional to the amplitude of waveform 200 and a function of the transition time of its leading edge (rise time), while the peak amplitude of the second pulse is a function of the amplitude of waveform 200 and the transition time of its trailing edge (decay time). Since the two pulses are of opposite polarity, either can be selected by clipping the other by means of a suitably polarized diode. Thus, either the rise or decay time can be selected for measurement. In FIG. 14, the rise time of pulse waveform 200 is chosen for measurement, and diode 207 is used to clip the second pulse referred to just above.

Waveform 200 is branched to a sampling divider 203 that is composed of resistors 197, 198 and 199. A sampling signal is developed at each end of resistor 198, and potentiometer 53 derives a waveform, such as 205, from the latter signals. This waveform is applied to input terminal 41.

Isolation resistor 202 and divider 203, considered together, form a divider, that provides a low resistance source for differentiating network 206. The divider composed of resistors 208 and 209, reduces the signal across diode 207 to a level within the range of comparator 39.

Waveform 205 has an amplitude that is proportional to the amplitude of waveform 200, while waveform 211 has an amplitude that is proportional to the amplitude and is a function of the rise time of 200. Since the amplitudes of 205 and 211 vary directly with the amplitude of waveform 200, the null position of potentiometer 53 is a function of the rise time and is independent of changes in the amplitude of the waveform being measured.

The differentiating network 206 is designed for maximum sensitivity to small percentage changes in rise time by making the time constant of the network as small as possible compared with the rise time being measured. The minimum time constant is fixed by the amount of attenuation required, since the peak amplitude of its output varies directly with the time constant of the network.

For most applications, a reasonable compromise between the sensitivity and attenuation requirements can be obtained by adjusting the time constant of network 206 to equal the shortest rise time to be measured. At the longest (worst) acceptable rise time, the output of the network will be less, but its sensitivity to small percentage changes in the rise time of waveform 200 will be greater. The resistors 197 to 199 are then chosen to provide a minimum output from potentiometer 53, which is equal to the peak amplitude of the signal from network 206, when the rise time of waveform 200 is maximum; and a maximum output, which is equal to the peak amplitude of the signal from network 206, when the rise time of 200 is minimum. The potentiometer 53 can then be adjusted to achieve a null on indicator 54 only if the rise time is within the specified limits.

For the measurement of rise time, the alternate circuit shown in FIG. 15 can be used to eliminate the unwanted pip at the trailing edge of signal 210 (FIG. 14). In this circuit, diode 216 in transformation network 217 is placed in series with the input to a differentiating network 215, comprising resistors 218, 219 and capacitor 220. For the duration of pulse waveform 200, the diode 216 conducts, permitting capacitor 220 to charge through resistor 218. Resistor 219 must have a value that is considerably larger than resistor 218 so that the voltage, to which the capacitor 220 charges, is substantially equal to the pulse amplitude delivered by diode 216. Since the time constant of capacitor 220 and its associated charging resistances is chosen to provide an output signal whose amplitude is sensitive to change in rise time, the output of the differentiating network 215 during the leading edge of the waveform 200 is identical with the one previously described. At the conclusion of waveform 200, diode 216 ceases to conduct, effectively disconnecting network 215 from the waveform. Resistor 219 insures that capacitor 220 will be completely discharged before the beginning of the next waveform in the output of module 201.

This circuit cannot be used for the measurement of the decay time of waveform 200, since the development of back-bias on diode 206 to suppress the unwanted pip in waveform 210 (FIG. 14) requires that capacitor 220 be charged when the undesired transition occurs.

If the signal, whose transition time is to be measured, is less than about one volt in amplitude, diodes cannot be used effectively to attenuate the unwanted pip. Measurement of the transition time may then be based on the peak-to-peak amplitude of both pips in the output of differentiating network 206. This can be done when changes in the performance of module 201 affect both transition times, and therefore the amplitudes of both pips, proportionally, or when performance changes result in a change of only one of the transition times. When module performance changes sometimes affect one of the transition times and at other times both, the measurement cannot be based on the peak-to-peak amplitude of both pips unless large errors can be tolerated. When rise and decay times are significantly different, as is often the case, the time constant of the differentiating network may be selected in such a fashion that the amplitude changes of the resultant waveform is most dependent on changes in the transition time that is to be evaluated and least dependent upon the other transition time.

*Rate of rise or decay (FIG. 16).*—In some applications the rate of rise (or decay) is a more important criterion of performance than rise (or decay) time. This is true of many waveforms used as triggers; for example, the rate of rise of the input to a parallel-triggered blocking oscillator is more important than its rise time. The discussion that follows is based on measurement of rate of rise, but applies equally to measurement of rate of decay unless otherwise noted.

A transformation network 226 utilized in the measurement of pulse rate of rise is illustrated in FIG. 16, where module 227 provides waveform 228 whose rate of rise is to be measured. The waveform is impressed on a differentiating network composed of capacitor 229 and resistors 230, 231 and 232. A sampling signal is developed at each end of resistor 231. Potentiometer 53, located across 231, has its arm connected to input terminal 40 and applies a waveform derived from the sampling signals to the input terminal. The output of A-C reference voltage source 235 is tied to the input terminal 41.

Diode 233 eliminates the portion of waveform 234 that corresponds to the transition time that is not being measured. More specifically, the diode is polarized to clip the pip of waveform 234 that corresponds to the trailing edge of waveform 228. By this means, the rise time is selected for measurement. In a similar manner, the decay time of waveform 234 could be measured by using diode 236, which is shown dotted in FIG. 16 and has a polarity reverse of diode 233.

If the time constant of the differentiating network, that comprises 229 to 232, is much smaller than the transition time of waveform 228, the output of the network will approach the true derivative of the input signal. In practice, a time constant of 0.05 or less of the transition time of 228, the waveform to be measured, is satisfactory. The values of divider resistors 230 to 232 are chosen so that the signal from potentiometer 53, when its arm is in the minimum position, is equal to the comparison voltage provided by source 235 when the rate of rise is at the maximum acceptable limit; and the signal from the potentiometer, when its arm is in the maximum output position, is equal to the comparison voltage provided by source 235 when the rate of rise is at the minimum acceptable limit. Under these conditions, the rate of waveform 238 is acceptable only when a null is obtained on indicator 54 within the range of potentiometer 53.

*Sweep linearity (FIG. 17).*—A sweep linearity measurement can be made with transformation network 241 in FIG. 17 by comparing the peak amplitude of the sweep output voltage 242 with the amplitude of a comparison voltage.

The module 244 being tested is a conventional type of sweep generator in which the switch 245 is opened at $t=0$ and is closed at $t=t_1$. (The switch is actually a vacuum tube or transistor which is either cut-off or is in a saturated condition.) The sweep output voltage 242 is developed across capacitor 246 during this time interval.

The sweep is a segment of an exponential whose linearity depends upon the fraction of the exponential used. The linearity is a function of $t_1/RC$, while the final (peak) of sweep voltage 242 is a function of $t_1/RC$ and the supply voltage $V_{bb}$, where R is the value of resistance 250, C is the value of capacitor 246, and $V_{bb}$ is the level of the voltage supplied by source 243. It follows that the peak of the sweep voltage 242 can be used as a measure of the linearity of the sweep.

The output voltage of source 243 is impressed on divider 251, and a comparison signal appears on the input terminal 41. The sweep voltage 242 is impressed on divider 252, and sampling signals appear, one at each end of resistor 253. Potentiometer 53, connected across resistor 253, applies a signal to input terminal 40 that is derived from the sampling signals. Since the signals on terminals 40 and 41 are proportional to the level of the voltage supplied by source 243, changes in this voltage do not affect the null displayed an null-indicator 54.

The range of amplitudes of waveform 242 over which the linearity is within acceptable limits is first determined. The values of the resistors in dividers 251 and 252 are then chosen so that the arm of potentiometer 53 is in its extreme upward position when the peak of voltage 242 is at its lowest acceptable value, and the arm is in its extreme downward position when the peak of 242 is at its highest acceptable value. Hence a null is obtained on indicator 54, as the potentiometer is varied over its range, only when the linearity of the sweep output voltage 242 is within acceptable limits.

*Frequency (FIGS. 18 to 20).*—In the transformation network for the measurement of frequency, either or both of the inputs to the comparator 39 may contain a filter, operating in the cut-off region, to convert frequency change to voltage change.

In FIG. 18, the output frequency of module 260 has a nominal value $f_o$, and transformation network 261 is used to measure the deviation, $\pm \Delta f$, of the module from this value. The output frequency is fed through low-pass filter 262 to input terminal 41 and through high-pass filter 263 to voltage divider 264. Potentiometer 53 is positioned across the upper resistor of the divider and the arm of the potentiometer is tied to the input terminal 40.

The voltage-frequency curves for filters 262 and 263 are designated by 265 and 266 (FIG. 18A), respectively. Using data illustrated by these curves as a guide, the attenuation of the filters and the values of the resistors in divider 264 are chosen in one embodiment so that indicator 54 will display a null, with potentiometer 53 in approximately its mid-position, when the output frequency of module 260 is at its nominal value, $f_o$.

It will be noted from FIG. 18A that when the output frequency deviates from $f_o$, the voltage applied to input terminals 40, 41 will change in opposite directions and must be compensated by a change in the setting of potentiometer 53 to obtain a null on indicator 54. The values of the resistors in divider 264 are such that a null can be obtained in the range of potentiometer 53 only if the frequency change is within acceptable design limits.

It will be understood that filters 262 and 263 can be band-pass filters having pass bands on each side of $f_o$ so that $f_o$ lies on the upper frequency skirt of one filter and on the lower frequency skirt of the other. A combination of a high or low-pass and a band-pass filter could also be used.

The arrangement in FIG. 19 may be used to measure frequencies in the medium and high-frequency range. In this figure, the output frequency of module 271 has a nominal value $f_o$ and the transformation network 270 is used to measure the deviation $\pm \Delta f$. The voltage, developed across potentiometer 53 and applied to input terminal 41, is derived from a divider that comprises resistors 272, 273 and parallel-resonant circuit 275. Likewise, the voltage applied to input terminal 40 is derived from a divider that comprises resistor 274 and parallel-resonant circuit 276.

As illustrated in FIG. 19A, which shows the voltage amplitude at each input to comparator 39 as a function of frequency, resonant circuit 275 is turned to frequency $f_2$, which is lower than $f_o$, while resonant circuit 276 is tuned to a higher frequency $f_2$.

The values of resistors 272 to 274 are chosen relative to the resonant impedance characteristics of the circuits 275, 276 in a fashion such that comparator 39 will effect a null on indicator 54, with potentiometer 53 in approximately its mid-position, when the output frequency of module 271 is at its nominal value, $f_o$. If the frequency changes, the voltages across circuits 275, 276 will change in opposite directions and must be compensated by a change in the setting of the potentiometer to obtain a null on indicator 54. A null can be restored within the range of the potentiometer only if the frequency change, $\Delta f$, is within acceptable limits.

Another transformation network, used in frequency measurements, is illustrated in FIG. 20. Here the output of module 280 has a nominal frequency $f_o$ and is applied to a voltage divider 281 in transformation network 282. Potentiometer 53 is positioned across the center resistor of the divider to provide a signal to input terminal 41. The output of the module is also applied to filter 283 that comprises a plurality of high-pass sections 284, connected in cascade. (Low-pass sections may be used, if desired.) The output of the filter is fed to input terminal 40.

FIG. 20A contains the voltage-frequency curve 285 of the signal applied to terminal 40. The designer, using information illustrated in this figure, determines the attenuation and sensitivity required for the measurement and selects the number of filter sections accordingly.

When the output frequency of module 280 deviates from $f_o$, the voltage applied to input terminal 40 will change in the manner shown in FIG. 20A and must be compensated, by a change in the setting of potentiometer 53, to obtain a null on indicator 54. The voltage, applied to terminal 41, does not change with a change in frequency. The values of the resistors in divider 281 are such that null-indicator 54 will display a null in this embodiment with potentiometer 53 in approximately its mid-position when the output frequency of module 280 is $f_o$. If a null can not be obtained on 54 as the potentiometer is varied over its range and provides a voltage between $V_1$ and $V_2$, then the frequency's departure from $f_o$ is not acceptable since it is greater than $\pm \Delta f$ and the module should be replaced.

It is noted that the sensitivity of the arrangement in FIG. 20 can be increased by replacing the resistive divider 281 with one or more low-pass sections of a suitable filter. The larger the signal amplitude supplied by the modules, the greater the attenuation that the filter must provide at $f_o$. This permits more filter sections to be used and makes the amplitude of the signal at the output of the filter more sensitive to changes in frequency, all other factors being equal.

*Phase shift (FIGS. 21 and 22)*.—Transformation network 290 is used in the measurement of phase shift, and is shown in FIG. 21, where $V_{in} \angle \theta$ and $V_o \angle \theta + \phi$ represent the input and output voltage, respectively, of module 291. Resistors 292 to 294 form a summing network 295.

Since the voltage across resistor 294 is to be proportional to the sum of $V_{in}$ and $V_o$, resistors 292 and 293 are selected to be sufficiently large, compared with resistor 294, that the effect of the latter on the current in either of the input branches of the summing network 295 is negligible. Although $I_1$ and $I_2$ need not be equal to determine whether the phase difference $\phi$ between $V_{in}$ and $V_o$ is within acceptable design limits, the case where $I_1$ and $I_2$ are equal is particularly useful. In this case, the resistance values of 292 and 293 are, preferably, chosen in such a way that $I_1$ and $I_2$ are equal, even though $V_{in}$ and $V_o$ are not. Under these conditions, the voltage appearing across resistor 294, and applied to terminal 40, is a function of the phase difference between the input and output voltages of module 291.

The relationship between the magnitude of the sum of $I_1$ and $I_2$ and the magnitude of one of these currents is illustrated by the curve in FIG. 21A for the summing network 295. In the vicinity of 0°, the amplitude of the sum is relatively insensitive to change in phase shift, but between 120° and 240° the sensitivity is good, and the relationship between the amplitude of the sum and the phase difference between the two sine waves is almost linear on each side of 180°. However, it should be noted that at 180°, there is no current through resistor 294.

The voltage, developed on input terminal 41, is obtained by attenuating voltage $V_{in}$ by means of divider 296. If the summing network 295 has been designed so that currents $I_1$ and $I_2$ are equal, the voltage developed on input terminal 40 may be thought of as the output of a divider consisting of 292 and 294 multiplied by a factor which depends on the phase difference between input voltage $V_{in}$ and output voltage $V_o$. This factor is plotted as the curve in FIG. 21A and permits the amplitude limits of the output voltages of summing network 295 to be determined once the resistance values of 292 and 294 and the permissible phase shift limits are known. After these voltages have been determined, the values of the resistors of comparison divider 296 can be calculated so that the output of potentiometer 53 will effect a balance on null-indicator 54 only when the phase difference between $V_{in}$ and $V_o$ is within the acceptable design limits.

The problem in testing the phase shift of an active device, such as an amplifier, with the basic transformation network 290 is that when the amplification varies within specified limits, such as $\pm 10\%$, the ratio of the current inputs to the summing network 295 is not constant. Since the calibration of divider 296 must be based on a particular ratio of inputs to the summing network, the change in amplification will introduce an error in the phase measurement.

The errors resulting from a $\pm 10\%$ change in amplification are plotted as a function of phase difference in FIG. 22A. The data for the curves was obtained by designing the transformation network 290 (FIG. 21) for equal input currents $I_1$, $I_2$ to the summing network 295 and determining the errors introduced when the amplification change caused a 10% difference in input currents. Within the region from 150° to 168° the error caused by the 10% change in amplification is less than $\pm 2$°. At 120° the error is about $\pm 3.5\%$, while for phase differences above 174°, no measurement can be made. Curves plotted for other percentage changes in amplification would be similar in shape but would differ in the magnitude of error.

In a region where the error is large, transformation network 297 (FIG. 22) is used to measure the phase difference between the voltages $V_{in}$ and $V_o$ appearing at the input and output of module 298. RC sections 299 are lag networks connected in cascade, and are used to deliberately introduce phase shift within the transformation network 297. (Lead networks could be used, if desired.) The RC sections are designed to shift the phase so the summing network 295 sees a phase difference which is within the region of minimum error.

Another application of transformation network 297 obtains when the limits of the phase difference to be measured are in adjacent quadrants, e.g., one is in the second quadrant and the other is in the third quadrant. The phase shift within the network can then be utilized to increase or decrease the total phase shift so that both limits will lie efficaciously in the same quadrant.

*A four-cell test instrument (FIGS. 23A and 23B).*—It is reasonable to expect that over a period of time a technician may become sufficiently familiar with the prime equipment to associate certain malfunctions with particular test sockets. This is particularly true if the assembly associated with that socket is a frequent offender. Hence the technician may wish to test the latter socket first, before following a prescribed test program. This is a natural reaction which must be satisfied by allowing the technician to follow his intuition. A serious consequence of forcing the technician to follow a fixed routine every time a failure occurs will be his negative attitude toward the testing sysem, resulting in less effective maintenance. Therefore, it is important that it be possible for him to test in any random order he chooses. However, certain technical difficulties can arise if random order testing is practiced. Two typical examples frequently encountered will illustrate the basic problem.

Suppose it is necessary to test the performance of a monostable multivibrator module in which the important characteristic is the output pulse amplitude. The limits of the output pulse amplitude can be tested by using a suitable one of the arrangements shown in FIGS. 8 to 10. However, should the triggering pulse to the multivibrator be absent or degraded, the multivibrator will become inoperative, and no output pulse will appear. The test instrument would indicate that failure had occurred in the multivibrator module although actually the fault is elsewhere. Similarly, if the input signal to an amplifier is absent, it is not possible to make a valid amplification measurement because under some conditions a "good" indication would convey incorrect intelligence, and under other conditions a "bad" indication would be an error.

In the two examples cited it is important to measure the input signal characteristic to determine whether a measurement on the assembly under test will be valid. Such an input test will be called a qualification test. The test on the assembly itself is called a performance test.

To avoid an erroneous performance measurement on the assembly, the four-cell test instrument, described below, may be programmed to make a number of qualification tests at the input at the same time that a performance test is made. This provides increased flexibility since the technician is not bound by a testing sequence, and increases the utility of the instrument, since it is possible to utilize unused cells to make additional performance measurements simultaneously.

With reference to FIGS. 23A and 23B, master cell A includes a comparator 39 and a zero-crossing detector 400. Likewise, each cell B, C and D includes a comparator 39 and a respective one of the zero-crossing detectors 401, 402 and 403. The detectors are substantially identical, but are numbered differently for convenience of explanation. The output of each detector controls one of relays 408 to 411, which in turn cooperate with constant-current source 412 and relay driver 413 to control indicators 414 and 415.

Terminals 10 and 9 on plug 31 are connected through switch 421 and a network 427 to a sampling-input terminal of the related comparator 39. Likewise, each pair of terminals 15 and 16, 23 and 24, 2 and 1 are connected through one of switches 422, 423 and 424 and a network 427 to a samling-input terminal of a related comparator 39. Further, each terminal 21, 4, 12 and 13 on plug 31 is tied through a network 427 to a comparison-input terminal of a related comparator.

A sampling-input terminal is one (terminal 40 or 41 in FIG. 3) to which the sampling signals are applied; and a comparison-input terminal is one (terminal 40 or 41) to which the comparison signal is applied.

Switches 421 through 425 are ganged together to form a multiple, manually-operated, sampling switch 426, which is positioned on probe 33 (FIG. 2). Switch 425 is shown in FIG. 23A and is also known in FIG. 24. The function of the switch will be discussed below in the description of the latter figure.

Each network 427 together with the input resistance of its corresponding comparator 39 and the capacity of the shielded cable to the input forms a frequency compensated attenuator.

The shunt choppers 436, 437 and 438 are tied to terminals 17, 18 and 20, respectively, while A-C reference source 439 is tied to terminal 19 on plug 31.

A typical operation of this four-cell instrument will be presented after the following discussion of some of the circuits used therein.

*Peak-to-peak detector and discharge circuit (FIG. 24).*—The schematic in FIG. 24 includes a diagram of a peak-to-peak detector and a circuit that supplies a pulse at an appropriate time to discharge the detector. There are eight such detectors in the four-cell instrument in FIGS. 23A, 23B (two in each cell) and the pulse, supplied by the circuit discharges each detector.

The signal received from wideband amplifier 44 (FIG. 3) is applied to capacitor 500 in detector 46 (FIG. 24). The detector is of conventional design and includes capacitors 500, 501 and diodes 502, 503. The output of the detector, developed across capacitor 501, is a positive D-C voltage that is proportional to the peak-to-peak amplitude of the signal received from the wideband amplifier 44. The output of detector 46 is applied to differential amplifier 48 (FIGS. 3 and 27).

In FIGS. 25A to 25C, the waveforms 504, 505 and 506 represent, under three possible test conditions, the D-C voltage output of each peak-to-peak detector 46 or 47 in comparator 39 during a cycle of testing. Under the test condition in FIG. 25A, at time $t_1$ plug 31 (FIG. 5) is inserted into socket 34 (FIG. 2). The performance of module 28 is considered good, since the waveform 504 (a function of the sampling signal applied to one of the terminals 40 or 41 in FIG. 3) crosses the comparison level (a function of the signal applied to the other terminal). In contrast, the performance of module 28 is considered bad under the test conditions illustrated in FIGS. 25B and 25C because the waveforms 505 and 506 fail to cross the comparison level. At time $t_3$, plug 31 is removed from socket 34, completing the testing cycle.

The ability of peak-to-peak detector 46 to respond faithfully to low frequency signals is a function of the discharge time constant (i.e., the longer the discharge time constant the better the low frequency response). The discharge constant is determined by $R_LC$, where C is the capacitance of capacitor 501 and $R_L$ (shown dotted in FIG. 24) is dependent upon the input resistance of differential amplifier 48 and the back resistance of diodes 502 and 503.

To understand the undesirable side effects of a long discharge time constant, refer back to FIG. 7, which illustrates the operation of the second embodiment of test instrument 32. It will be recalled that the operation involves alternately switching the sampling voltage, developed across resistor 86, from a high to a low level and comparing it with the voltage appearing on terminal 41.

Now assume that the $R_LC$ discharge time constant is 2 seconds and the total discharge time is in the order of 10 seconds. If, under this assumption, the performance of module 81 is within acceptable limits, but the switching rate of switch 55 is about one per second, detector 46 may not discharge to the point where the sampling voltage crosses the comparison level. The performance of module 81 would then be deemed "bad," whereas if the switching rate has been one per 20 seconds, the performance would have been deemed "good." This will be apparent from FIG. 25A.

To avoid this source of error and yet permit reasonably fast switching, peak-to-peak detector 46 is provided with a circuit 512 (FIG. 24) that discharges the detector rapidly from the high level to almost zero and then allows it to recharge to the low level, which it can do quickly. This is illustrated in FIGS. 26A to 26C where waveforms 513 to 515 represent the detector output voltage during the same testing conditions illustrated in FIGS. 25A to 25C. At time $t_2$, when switch 55 is actuated, detector 46 rapidly discharges to almost zero and then quickly returns to the low level of the sampling voltage. The source of possible error noted above is thus removed, since the time required for the detector output voltage to change from the high to the low level is now much faster than the switching rate.

The operation of discharge circuit 512 and the function of switch 425 will now be explained with the assistance of FIG. 24. First, it is noted that when plug 31 is inserted into a test socket, such as 34 in FIG. 28, terminal 22 in both the socket and plug is grounded. Thus, when the plug is inserted into a test socket (plug and socket are designated as connector 35), capacitor 520 is short circuited and when switch 425 is actuated, the short circuit is removed from capacitor 520, which is then charged through limiting resistor 521 by potential source 522. As the voltage on capacitor 520 rises, a positive discharge pulse is coupled through capacitor 523 to the base of transistor 526, turning the transistor on to discharge capacitor 501 to ground. This, in effect, shorts the output of detector 46 to ground, momentarily. After the termination of the discharge pulse, the detector quickly charges to the low level as shown in FIG. 26A. The discharge pulse is also applied to transistors, such as 526, in the detectors in cells A to D (FIGS. 23A, 23B) to discharge these detectors in the manner just described.

Diode 527, which is positioned across resistor 528, limits the destructive reverse voltage across the base to emitter junction of transistor 526 to a safe level when switch 425 is returned to its normal position shown in FIG. 24.

When switch 426 (FIG. 23A) is electrically driven, reed relays are used instead of switches 421 through 425 and are driven by a single coil. The circuit, that drives the coil, provides a pulse that is employed to discharge the detectors in each cell A to D. Hence, circuit 512 and the relay driver 413 in FIG. 24 may be eliminated.

*Differential amplifier and zero-crossing detector (FIG. 27).*—The differential amplifier 48 and zero-crossing detector 400, used in master cell A, are shown in FIG. 27. It will be understood, however, that cells B, C and D contain similar circuits.

The signals, received from peak-to-peak detectors 46 and 47 (FIG. 3), are applied to the grids of electron tubes 551 and 552 in the differential amplifier 48. The output of the amplifier is developed across resistor 553 and is a voltage that is proportional to the difference between the signals received from the detectors. Resistors 554 and 555 provide a grid return for electron tubes 551 and 552, respectively, and resistor 556 provides a common cathode return.

The voltage, appearing at one end of resistor 553, is applied to the base of transistor 557, which is positioned in detector 400; the voltage, appearing at the other end, is applied to the base of transistor 558. The transistors are connected as a conventional emitter-coupled, differential amplifier 561 with a single-ended output, and have a common emitter resistor 562. When the input voltages on the base of each transistor 557 and 558 are equal, variable resistor 566 is adjusted so that the output of amplifier 561 is just equal to a fixed reference level. This level is equal to the sum of the reference voltage provided by the Zener diode 563, the forward drop of diode 564 and the base-emitter voltage of transistor 565.

As the base of transistor 557 becomes more positive than the base of transistor 558 (a result of crossing zero in one direction) the output voltage of differential amplifier 561 will cause Zener diode 563 to conduct, causing base current to flow into transistor 565. Emitter current will then flow into tunnel diode 570, switching the diode to its high voltage stable state. Destructive current flow through 570 is prevented by current-limiting resistor 571. When the diode is switched, a small positive pulse is generated. This pulse reverse biases transistor 577 and thus is not amplified.

As the base of transistor 558 becomes more positive than the base of 557 (a result of crossing zero in the other direction) the output of amplifier 561 will drop below the reference level, and this will cause transistor 565 to turn off. The tunnel diode 570 will then switch to its low voltage stable state, generating a negative pulse. However, the output of the amplifier can not drop below the reference level instantaneously because of the feedback capacitor 573 which tends to delay this change. This delay is essential to insure that the narrow pulse, that discharges detectors 46, 47, does not cause a false indication of zero crossing. Stated differently, with reference to FIG. 26B a time delay must be present so that the discharging pulse, denominated as 514A, from detector 46 will not effect energization of relay 408 and will not be recorded as a zero-crossing.

The negative pulse generated by tunnel diode 570, after the delay, is passed through capacitor 576 and is amplified and inverted by transistor 577. (Resistor 578 provides a discharge path for the capacitor.) The output of transistor 577 is used to trigger controlled rectifier 575 into conduction, thereby energizing relay 408, as will now be explained in detail.

Initially, capacitor 581 is charged by negative potential source 580 through a circuit that includes resistors 582, 583 and 584. The voltage drop across resistor 584 places a negative charge on the gate of controlled rectifier 575 and maintains the rectifier in a nonconducting condition. When transistor 577 is turned on, a path is completed to ground for capacitor 581, which is then discharged into the gate of controlled rectifier 575, thereby turning 575 on. Resistor 587 in series with capacitor 585 limits the peak current through the controlled rectifier to a safe level. The gate of the controlled rectifier returns to a slightly negative voltage, due to the voltage drop across resistor 584, at the instant the trigger pulse terminates and is maintained at a negative potential after capacitor 581 is charged. This insures turn-off of the controlled rectifier 575 as capacitor 585 begins to charge toward the level of voltage provided by the positive voltage source 586.

Initially, capacitor 585 is charged by source 586 and is discharged when rectifier 575 conducts. After the rectifier is turned off, the capacitor charges through relay 408 with a time constant that is determined by the capacitance of 585 and the resistance of 408 and of 587. The time interval during which the relay remains closed is determined by the RC charging time and the drop out current of the relay.

Thus, the function of the zero-crossing detector 400 is to energize relay 408 when the output of the differential amplifier 48 passes through zero. The relay remains closed for a selected time interval after the zero-crossing and then drops out. To close the relay again, switch 425 (FIG. 24) must be actuated again to initiate another zero-crossing.

*Relay driver, good and bad indicators (Fig. 24).*—Returning to FIG. 24, the function of relay driver 413 is to energize indicator actuating relay 600 to control the power to indicators 414, 415 when switch 425 is actuated. When switch 425 is in its normal position, shown in FIG. 24, capacitor 601 is charged and capacitor 602 is discharged. The former capacitor is charged by negative potential source 603 through a path that includes resistors 604, 605 and 606.

When switch 425 is closed the lower end of resistor 610 is grounded, and consequently, capacitor 602 will charge while capacitor 601 will discharge. As the latter capacitor discharges, a positive pulse is developed across resistor 606 and is applied to the gate of controlled rectifier 611, which is turned on. Capacitor 602, as it charges, places a negative voltage on the gate of the rectifier, insuring that the rectifier will turn off. When switch 425 returns to its normal position, capacitor 602 discharges through resistor 610 and is ready for another cycle.

The positive potential source 612 charges capacitor 613 through a path that includes indicator actuating relay 600 and current limiting resistor 614. The capacitor is normally charged and the relay normally open. When controlled rectifier 611 is turned on, capacitor 613 is discharged through an obvious path to ground, and at the same time, current flows through the rectifier to energize relay 600. With the termination of the positive pulse developed across resistor 605, the rectifier is opened, but current continues to flow through relay 600 to capacitor 613, charging the capacitor. The relay remains closed for a time interval that is dependent upon its drop out current, its resistance and the capacitance of 613.

When relay 600 is closed, current will flow from current source 412 to indicators 414 and 415. Current source 412 is actually a voltage source having an internal resistance relatively high compared with its load. The path of the current is controlled by relays 408 to 411 and the manner in which connections 5 to 8 are programmed. Assume, for example, that the programming connections are floating. When relay 600 is closed, a path, completed from source 412, permits current to flow into the base of each transistor 620 and 621. However, the current flowing into the base of transistor 620 will be much less than the current into the base of 621, since diode 622, positioned in series with the base lead of 620, causes an additional voltage drop. Most of the current will therefore flow into the base of transistor 621, which is turned on. Current then flows from the base of transistor 624 through resistor 623, turning on transistor 624 to energize the red lamp 625 in bad indicator 415.

Since master cell A is always programmed for a performance test, if relay 408 is actuated as a result of zero-crossing, the connection to the base of transistor 621 is opened and current flows into the base of transistor 620, turning the latter transistor on. Current will then flow through resistor 628 from the base of transistor 627, which turns on 627. This will energize green lamp 629 in the good indicator 414.

It will be apparent that a performance measurement can be made with either cell B, C or D by tying connection 6, 7, or 8, respectively to 5. Then, all the relays 408 to 411, that are tied to connection 5, must be actuated before green lamp 629 will go on.

Cells B, C or D may be programmed for a qualification measurement by grounding either connection 6, 7 or 8, respectively. If, for example, connection 8 is grounded, current cannot flow into either indicator 414 or 415 when relay 600 is energized since the base of each transistor 621 and 620 is grounded through the relay 411. If, however, the relay operates, as a result of zero-crossing in cell D, the base of each transistor 620 and 621 will no longer be grounded, and the lamp in either the good or bad indicator will light depending on whether relay 408 in cell A is actuated.

In summary, cell A is always programmed for a performance measurement, while cells B to D can be programmed for either a qualification or a performance measurement. During each testing cycle, one of the following readings will be provided by indicators 414, 415:

(a) Green lamp 629 will light if all cells A to D, that are programmed, actuate their relays 408 to 411.
(b) Red lamp 625 will light if all cells B to D, programmed for a qualification test, actuate their relays 409 to 411, and if one or more of the cells A to D, programmed for a performance test does not actuate its relay 408 to 411.
(c) Neither lamp 625 nor 629 will light if any of the cells B to D, programmed for a qualification test, fails to actuate the related relay 409 to 411.

*Typical operation (FIGS. 23A, 23B and 28).*—A typical operation of the four-cell test instrument is illustrated in FIG. 28 by a module evaluation in which two qualification and two performance tests must be made. Module 650 is a parallel-triggered, blocking oscillator whose output waveform 651 has two important characteristics that must be measured, the amplitude A and the width W. Since the performance of the blocking oscillator will be affected by the quality of the input pulse, the amplitude A' and rise time $t$ of trigger pulse 652 must be measured as qualifying measurements.

Transformation networks 655 and 660 are used to make qualification measurements. The former network is efficaciously a divider composed of resistors 656 and 657, and is used to measure the amplitude of pulse 652. (See FIG. 8.) Trigger pulse 652 is fed through isolation resistor 658 to the network 655, whose output is fed through terminal 2 of socket 34, plug 31 (FIG. 23A) and switch 424 to the sampling-input terminal of the comparator in cell D. Reference source 439 is connected to the comparison-input terminal of this comparator by means of a jumper from terminal 19 to terminal 13 on socket 34. Since it is necessary to determine only if the amplitude of waveform 652 is greater than a specified minimum value, the measurement is made to one limit only. Therefore, the divider in network 655 consists of only two resistors 656, 657 and one of the input contacts of sampling switch 424 is grounded through terminal 1 on socket 34. It will be recalled that programming connection 8 for cell D is tied to terminal 8 on plug 31. Cell D is therefore programmed for a qualification measurement by connecting a jumper from programming terminal 8 to terminal 11 on socket 34, which connects terminal 11 on plug 31 to ground when the plug is inserted in the socket.

Transformation network 660 is also used in a qualifying measurement to determine whether the rise time $t$ of trigger pulse 652 is less than a specified value. This transformation network is the same in principle as transformation network 204 (FIG. 14), but since there is no lower limit of the measurement, divider 661 is composed of only two resistors, and one of the input contacts of switch 422 is grounded through terminal 16 on socket 34. The output of divider 661 is applied through terminals 15 on socket 34 and plug 31 (FIG. 23A) and switch 422 to the sampling-input terminal of the comparator in cell B. The output of divider 662 is transmitted through terminal 4, socket 34 to the comparison-input terminal of the latter comparator. Because cell B is used for a qualification measurement, programming terminal 6 is connected to ground through terminal 11 on socket 34.

Transformation networks 666 and 667 are used to make performance measurements. Transformation network 666 is composed of divider 668 and is used to measure the amplitude of the waveform 651 by the technique described for network 112 in FIG. 8. Briefly, waveform 651 is applied through isolating resistor 669 to divider 668 and the sampling voltages, developed at each end of the center resistor of 668, are sequentially applied through terminals 9 and 10 of socket 34 to the sampling-input terminal of the comparator in cell A. The output of reference source 439 is transmitted by means of a jumper between terminals 19 and 21 on socket 34 to the comparison-input terminal of the latter comparator. No programming connection is required for this measurement since it is made by master cell A which is always programmed for a performance measurement.

Finally transformation network 667 is used to measure the width of waveform 651 by the principle embodied in transformation network 185 (FIG. 13). Here switch 423 (FIG. 23A) is used to alternately transmit the sampling voltages appearing at each end of the resistor 670 to the sampling-terminal of the comparator in cell C. The output of integrator 671 is fed through terminal 12 to the comparison-input terminal of the latter comparator; and the cell is programmed for performance by connecting a jumper between terminals 7 and 5 on socket 34.

With reference to FIG. 28A, which represents the timing of a test cycle, plug 31 is inserted into socket 34 at time $t_0$. Between $t_0$ and $t_1$, the peak-to-peak detectors 46 and 47 in each cell A to D are charged, one to the sampling-input level and the other to the comparison-input level. For the example under consideration, it will be assumed that the former level is initially higher than the latter level.

At time $t_1$, sampling switch 426 is actuated and each peak-to-peak detector, that is connected through a wide-band amplifier 44 or 45 (FIG. 3) to a sampling-input terminal, is discharged and then recharged. Actually, both detectors in each cell A to D are discharged, but to simplify the discussion, one may neglect the discharge of the detectors connected through a wide-band amplifier 44 or 45 to a comparison-input terminal.

Now, assume first that all the sampling-input detectors recharge to a new level, which is lower than the comparison-input level. The sampling-input levels of the comparators in each cell A to D has therefore crossed the related comparison-input level, i.e., changed from a level higher than the comparison-input level to one which is lower, as shown in FIG. 28A. All tests will therefore indicated acceptable operation of the blocking oscillator 650 and relays 408 to 411 (FIG. 24) will be actuated, opening all their contacts, at time $t_2$.

At $t_2$, the indicator actuating relay 600 is energized, and a circuit, that includes source 626 and transistor 627, is completed to energize the green lamp 629 (FIG. 24). At time $t_3$, relay 600 and the green lamp are de-energized and relays 408 to 411 drop out shortly after $t_3$. Finally, at $t_4$, plug 31 is removed from socket 34 and the test cycle is completed.

In practice, the current supplied by positive potential source 626 to transistors 624 and 627 in FIG. 24 may be delayed by conventional means so that no indication will be provided by either good indicator 414 or bad indicator 415 until relays 408 to 411 have completed their switching.

Now assume that the amplitude A of waveform 651 is not within acceptable design limits. When sampling switch 426 is actuated, the sampling-input of the detector in cell A will not cross the associated comparison-input level. This may occur because the new test input level remains higher than the comparison input level, or because the sampling-input level was initially lower than the comparison-input level and dropped still lower when the sampling-input detector recharged. Relay 408 will not be energized, and transistors 621 and 624 will be turned on to energize red lamp 625, indicating that the blocking oscillator 650 is not functioning properly.

Now assume that the rise time of triggering pulse 652 is longer than its specified limit. After the sampling-input detector in cell B is discharged, the sampling-input level will not cross the comparison level, and as a result, relay 409 will not be energized to open its contacts. Current source 412 will then be connected to ground through programming connection 6 and terminal 11 on plug 31, and neither lamp 625 or 629 will be energized, indicating that a valid test was not performed on the blocking oscillator 650.

*Self-checking test instrument (FIGS. 29 and 30).*—It will be recalled that one of the objects of the present invention is to provide a test instrument that has self-checking capability. The self-checking techniques used indicate to the operator whether the instrument is "good," whether one or more of the cells are unbalanced or whether the test instrument is in need of repair. The self-checking circuitry is self-contained in the instrument, requires no external equipment, and relies on a principle that will permit inherently reliable testing.

In FIG. 29, the equality of gain of the pair of amplifiers 44 and 45 is important to the overall accuracy of instrument 32. The amplifiers are identical and are preferably designed for a moderately high gain stability; however, small drifts in components can cause their gains to drift apart. This should be checked. The zero-crossing detector 56, although designed with an inherent stability, must nevertheless be tested for satisfactory operation, and both shunt chopper 689 and voltage source 690 must be tested for normal operation.

A test of the chopper operation, the zero-crossing and gain equality can be combined in one test, as shown in FIG. 29. Self-test socket 693 is positioned on instrument 32. The output of voltage source 690 is applied through resistor 691 to an attenuator 692 that is located on the self-test socket. Chopper 689 is tied to the top of the attenuator to provide a periodic voltage by modulating the D-C voltage supplied by 690. When plug 31 is inserted into socket 693, a tap, positioned on the attenuator between resistors 696 and 697, is tied to input terminal 41; and other taps on the attenuator are tied to switch 694. The arm of the switch is connected to put terminal 40.

When plug 31 is inserted into socket 693 and switch 694 is actuated, if the shunt chopper 689 is inoperative, since amplifiers 44 and 45 will not accept a steady D-C input voltage, the bad indicator 58 will be energized to indicate that the instrument is not functioning properly.

When chopper 689 is functioning properly and switch 694 is in the top position shown in FIG. 29, the voltage appearing on input terminal 40 will be slightly higher than the voltage appearing on input terminal 41, causing a slight unbalance in meter 700, which is connected across the output terminals 49 of the differential amplifier 48. When switch 694 is thrown to the lower position in the figure, the voltage appearing on terminal 40 will be slightly lower than the voltage appearing on terminal 41, causing meter 700 to assume a slight unbalance in the other direction. The amount of unbalance can be made as small as desired by selecting small and very close values for resistors 696 and 697. Thus, if the amplifiers 44, 45 are balanced, the pointer of meter 700 will pass through zero with equal excursions on each side of zero as switch 694 is actuated.

When the amplifiers 44, 45 are balanced and the output of differential amplifier 48 passes through zero, the good indicator 57 will be activated only if the detector 56 is functioning properly. Therefore, if the amplifiers 44, 45 are unbalanced or detector 56 is not functioning properly, the bad indicator 58 will be activated.

It will be apparent that chopper 689, resistor 691 and source 690 could be replaced in FIG. 29 by an A-C reference source connected to the top of attenuator 692, and the test operation would be essentially the same, except that the presence of the reference source would be evaluated instead of the output of chopper 689 and source 690.

The self-checking technique used with the four-cell instrument in FIGS. 23A and 23B is a combination of those set forth immediately above. The four-cell instrument contains three shunt choppers 436 to 438 and one A-C reference source 439. The test used to check the whole instrument is accomplished with one self-test socket 720 (FIG. 30) that is located on the instrument. The output of potential source 721 is branched through resistors 723, 724 and 725 to the top of attenuators 726A, 726B and 726C, respectively. Attenuators 726A to 726D are substantially identical and it it is apparent that two or more of the cells could be tested simultaneously by any one attenuator.

The sampling-input of the comparator in cell D (FIG. 23B) is tied through terminals 1 and 2 on plug 31 and socket 720 (FIG. 30) to related taps on attenuator 726B. Shunt chopper 436 is applied to the top of the attenuator via terminal 17 on the plug and socket. Finally, the comparison-input of the comparator in cell D is connected to a tap on attenuator 726B by means of terminal 13. Thus, cell D is wired for a performance measurement on itself, similar to the one that is made on the one-cell test instrument 32 in FIG. 29.

In a similar manner, cell B is wired for a self-performance measurement, using attenuator 726A and shunt chopper 437; and master cell A is wired for a self-performance measurement, using attenuator 726C and shunt chopper 438. Likewise, cell C is wired for a self-performance measurement, using A-C reference source 439 and attenuator 726D.

It will be apparent that if the amplifiers 44, 45 are out of balance in any cell A to D, or if a zero-crossing detector 46 in any cell fails to function properly, or if one of the choppers 436 to 438 is defective, or reference source 439 is absent, the under any one or more of these conditions, bad indicator 415 will be energized. If the operator obtains a bad indication, a selector switch, not shown, is provided so that a single internal meter can check the balance of each cell. Separate controls, not shown, are provided to balance the amplifiers 44, 45 of any cell not in proper balance.

*Inserting a test signal (FIG. 31).*—In the amplification test previously described (FIGS. 6, 7) amplifier 81 is performing its normal function under test, and the normal input signal is used to provide the signals for the fault location test. In some cases this is not practicable, for example:

(a) When the characteristics of the normal signal are undesirable or impossible to use, e.g., when the signal is discontinuous, such as exists in a receiver.

(b) When the input signal is lower than the minimum signal required by the test instrument 32.

(c) When the normal signal does not have the characteristics required to reveal a fault.

In these cases, a stimulus generator module can be used. A stimulus generator is defined as a module built into prime equipment 29 (FIG. 2) solely for the purpose of providing one or more test signals. In the normal operation of 29, this module is not used; it is energized only when instrument 32 requires a signal from the module for test purposes.

For the testing of sine wave amplifiers, the stimulus generator might be an oscillator that provides a signal having the amplitude and frequency required by the circuit under test. The signal could be modulated, if necessary. For testing pulse amplifiers, a stimulus generator that produces pulses having the desired analytical properties would be required. In some cases such a generator might be used for testing RC-coupled amplifiers, even though the normal input to the amplifier is a sine wave. Other types of stimulus generators include sawtooth, square wave and noise generators.

FIG. 31 illustrates a stimulus generator 740 used in testing a high gain I-F amplifier-detector, contained in module 741, by providing a modulated signal at the intermediate frequency. Here oscillator 742 generates the desired frequency which is applied to modulator 743, where it is modulated by the output of waveform generator 744. The signal, provided by the modulator, is reduced in magnitude in a stable, fixed attenuator 745 to develop a signal of desired amplitude.

A jumper is positioned between terminals 3 and 14 on plug 31. The plug and socket comprise connector 35. (See FIGS. 1, 23A and 28.) When the plug is inserted in socket 34, a circuit, not shown, is completed to turn on the power supply for the stimulus generator 740 and a relay is actuated to throw switch 750 to the lower position in FIG. 31. (As an alternative, the power supply and switch 750 could be controlled manually.)

With switch 750 in its lower position in FIG. 31, the normal input to I-F amplifier 751 is disconnected and the output of attenuator 745 is fed to 751, whose output, in turn, is demodulated in detector 752 and is sent to divider 85. The sampling signals are developed, one at each end of the center resistor of divider 85, and potentiometer 53 is positioned across this resistor to derive a signal that is applied to input terminal 40.

Within the stimulus generator 740, detector 753 is connected to the output of modulator 743 to develop a demodulated signal that is transmitted through low-pass filter 754 and divider 84 to input terminal 41. The signal appearing on 41 is the comparison signal.

Again, as in FIGS. 6 and 7, the values of the resistors in dividers 84 and 85 are selected in such a fashion that the variation of potentiometer 53 from one extreme to the other will create a null on indicator 54 only if the amplification of amplifier 751, in the module under test, is within specified design limits.

*Test socket sequence programming (FIG. 32).*—Using the techniques of the present invention, programming is accomplished by prescribing the sequence used by the technician in selecting test sockets 34 on prime equipment 29 (FIG. 1), without requiring him to make any decisions. These techniques can be applied with equal facility to large or small aggregates of modules. For example, three amplifier modules, each of which is tested individually, can be tested as a group. By setting up group tests on the prime equipment as well as individual tests, economies in testing time can be realized.

One test socket configuration is illustrated in FIG. 32. Here dark and light test sockets are arranged in a rectangular array on panel 760. All input test sockets and group test sockets are dark-colored. The light-colored sockets are module tests. If a module is the only member of a group, its test socket is dark-colored. The identifying nomenclature of each socket is below the socket. The module test sockets are given a numerical designation and all other sockets are given a letter designation. Imprinted above each socket will be either a "Replace" instruction or a "Test" instruction. The testing sequence is uniform and simple:

(1) The dark-colored sockets are tested sequentially proceeding from left to right and top to bottom in the manner that a printed page is read.

(2) When a bad indication is encountered, the instruction above that socket is followed.

(3) No light-colored socket is tested unless the instruction on a dark-colored "bad" socket so directs.

For example, if it is assumed that a fault exists in module A–26, the following test routine will automatically ensue:

(1) Sockets A, B, C, D, E, F, G, H, I, and J will be tested in order.

(2) Test socket J will indicate "bad" and the instruction above that socket will direct the technician to light-colored sockets 15, 16, 17, 18, 19, 20, and 21.

(3) By following these instructions the technician will find that test socket 20 indicates "bad." The instruction, located above that socket, will direct the technician to replace module A–26.

The replace instruction on the test sockets can direct the technician to replace a module by either reference to the module nomenclature or to the module location in terms of 3 dimensional coordinates. An advantage of the coordinate system is that the defective module can positively be identified even though the equipment has a multiplicity of modules with identical nomenclature.

When this system is used, the width, height, and depth of prime equipment 29 are subdivided into increments by a system of grid lines with suitable identifying symbols assigned to each. For example, the width may be divided into equal increments by grid lines identified by double letters, the height by lines designated by numbers, and the depth by lines identified by single letters. The replace instruction might then read "Replace FF–9–C" to indicate that the module to be replaced is located behind a point on the front panel identified by coordinates FF and 9 at a depth identified by grid line C.

It is never necessary to read the socket nomenclature unless a bad indication is observed. Occasionally more than one test socket is required to completely test a module. This need be no concern of the technician, since his instructions for corrective action are automatically conveyed to him when he observed a failure on a test socket.

The testing sequence is set up so that the first tests are always input tests (FIG. 22, sockets A, B, C and D). These input tests confirm whether or not the proper electrical signals and input power are being supplied to the equipment under test. The instruction above the group test sockets directs the technician to the test sockets of the modules that comprise the group. When there is only one module in a group, its test sockets will be dark-colored.

It will be apparent that the technician need not be acquainted with the type of tests being performed and that by following the invariant test procedure set forth above he can make the most sophisticated tests with only a few minutes instruction.

*Layout of the prime equipment (FIG. 33).*—The surface of panel 760 (FIG. 32) on which the test sockets are mounted should be chosen to be readily accessible during the testing sequence, yet provide mechanical and environmental protection for the sockets between maintenance periods. FIG. 33 is suggested as one way to achieve these objectives in conventional microminiaturized equipment.

In this figure, the equipment console 761 contains the prime equipment 29 (FIG. 2) in a multiplicity of drawers 762, which are interconnected by retractable cables 763. The modules 764 to be tested are mounted, as plug-in units, on sockets 765. The test sockets, represented in FIGS. 33, 33A as 766, are mounted on panel 760.

In one arrangement, not shown, a plurality of microswitches are attached to a test socket 766 in such a manner that the actuating buttons of the switches are in contact with a movable depress bracket, which is also mounted on the switch. When the plug 31 (FIG. 2) is inserted into the socket, a slidable plunger, positioned in the socket, is actuated by the plug to move the bracket to close or open the microswitches, as desired. The switches may be used to disconnect the input circuit of a module and to insert a test input-signal, while at the same time energizing a stimulus module, such as 740 in FIG. 31. When plug 31 is removed from the test socket 766, an over-travel compensator spring, located on the plunger, returns the plunger to its normal position and permits the depress bracket to return to its normal position.

Certain, and sometimes all, of the components of the various transformation networks are sandwiched between printed circuit boards 767 (FIGS. 33, 33A) which are mounted on the back of test sockets 766. Frequently, some of the components are mounted on or in close proximity to a module socket 765, and since the socket into which the module plugs often is not located in a position adjacent to the associated test socket 766, short shielded cables will usually be required to convey the sampling and comparison signals to the test socket.

The wiring between the transformation networks and the modules is dependent upon the tests to be performed in accordance with the techniques previously described. The modules are interconnected to perform the desired functions of prime equipment 29. The most advantageous wiring between modules and between each module and its transformation network is not shown, but will be apparent to those skilled in the art.

What is claimed is:

1. In a system for detecting the presence of a fault in a device by evaluating an electrical characteristic of at least one predetermined signal that under normal operation of said device has a value that lies within upper and lower design limits, transforming means responsive to at least one predetermined signal for providing a first comparison signal and first and second sampling signals in such a manner that the magnitudes of said first comparison signal and the sampling signals are each a function of said design limits, the magnitude of said first comparison signal being such that it lies between the respective magnitudes of said sampling signals only when the value of said characteristic lies within said design limits, means for comparing the magnitudes of a pair of signals, said comparing means having a first and second input, means for deriving a second comparison signal from said sampling signals, means for varying the magnitude of said second comparison signal between the magnitudes of said sampling signals, means for applying said first and second comparison signals to the first and second input, respectively, and means for detecting the occurrence of a null in the comparator.

2. In the system set forth in claim 1 including means for providing a reference signal and a predetermined signal, and wherein said transforming means comprises: means responsive to said reference signal and to said predetermined signal for providing a first comparison signal and first and second sampling signals in such a manner that the magnitudes of said first comparison signal and the sampling signals are each a function of said design limits, the magnitude of said first comparison signal being such that it lies between the respective magnitudes of said sampling signals only when the value of said characteristic lies within said design limits.

3. The system set forth in claim 1 wherein said transforming means includes a resistor, said first sampling signal appearing at one end and said second sampling signal appearing at the other end of said resistor, and wherein said means for deriving a second comparison signal includes a potentiometer positioned across said resistor, whereby said second comparison signal is a function of the signal appearing on the arm of said potentiometer.

4. The system set forth in claim 2 wherein said device comprises an amplifier whose output comprises said predetermined signal and has a magnitude that under normal operating conditions of said amplifier lies within said design limits, and wherein said reference signal comprises the input signal to said amplifier.

5. The system set forth in claim 2 wherein said device comprises an amplifier whose output signal comprises said predetermined signal and has a magnitude that under normal operating conditions of said amplifier lies within upper and lower design limits, wherein said means for providing a reference signal comprises: a signal generator, means for deriving a reference signal from said signal generator, said system including signal applying means comprising: a terminal, an attenuator connected to the output of said signal generator, and switching means for connecting either said terminal or the output of said attenuator to the input of said amplifier, and wherein said transforming means comprises: means responsive to said reference signal for providing a first comparison signal having a magnitude dependent upon the magnitude of said reference signal, means responsive to the output of said amplifier for providing first and second sampling signals, each having a magnitude dependent upon the magnitude of said output signal, the magnitude of said first comparison signal being such that it lies between the respective magnitudes of said sampling signals only when the magnitude of said output signal lies within the design limits.

6. The system set forth in claim 2 wherein said predetermined signal comprises a direct current output voltage having a magnitude that under normal operating conditions of said device lies within upper and lower design limits, and wherein said transforming means comprises: means responsive to said output voltage for deriving first and second sampling signals, each having a respective substantially constant level, means for converting the constant level of each sampling signal to a pulsating direct current voltage having a peak-to-peak amplitude equal to its constant level, means for deriving a first comparison signal from said reference signal, the magnitude of said first comparison signal being such that it lies between the respective magnitudes of said sampling signals only when the magnitude of said output voltage lies within said design limits.

7. The system set forth in claim 2 wherein said predetermined signal comprises a voltage having a magnitude that under normal operating conditions of said device lies within upper and lower design limits, said voltage containing overshoot, and wherein said transforming means comprises: means responsive to said output voltage for substantially eliminating said overshoot, means responsive to the output of said last-mentioned means for deriving first and second sampling signals, means for deriving a first comparison signal from said reference signal, the magnitude of said first comparison signal being such that it lies between the respective magnitudes of said sampling signals only when the magnitude of said output voltage lies within said design limits.

8. The system set forth in claim 2 wherein said predetermined signal comprises a voltage having a magnitude that under normal operating conditions of said device lies within upper and lower design limits, said voltage containing droop, and wherein said transforming means comprises: means responsive to the voltage for substantially eliminating said droop, means responsive to the output of said last-mentioned means for deriving first and second sampling signals, means for deriving a first comparison signal from said reference signal, the magnitude of said first comparison signal being such that it lies between the respective magnitudes of said sampling signals only when the magnitude of said voltage lies within said design limits.

9. The system set forth in claim 2 wherein said predetermined signal comprises a waveform having a rate of rise with a value that under normal operating conditions of said device lies within upper and lower design limits, and wherein the transforming means comprises: means for deriving a first comparison signal from said reference signal, means responsive to said waveform for providing first and second sampling signals, each having a magnitude dependent upon the rate of rise of said waveform, the magnitude of said first comparison signal being such that it lies between the respective magnitudes of said sampling signals only when the value of said rate of rise lies within said design limits.

10. The system set forth in claim 2 wherein said predetermined signal comprises a waveform having a rate of decay with a value that under normal operating conditions of said device lies within upper and lower design limits, and wherein the transforming means comprises: means for deriving a first comparison signal from said reference signal, means responsive to said waveform for providing first and second sampling signals, each having a magnitude dependent upon the rate of decay of said waveform, the magnitude of said first comparison signal being such that it lies between the respective magnitudes of said sampling signals only when the value of said rate of decay lies within said design limits.

11. In a system for detecting the presence of a fault in a device by evaluating an electrical characteristic of a predetermined signal that under normal operation of said device has a value that lies within upper and lower design limits, transforming means responsive to said predetermined signal for providing a first comparison signal having a magnitude that is dependent upon the amplitude of said predetermined signal and substantially independent of said electrical characteristic, said transforming means including means responsive to said predetermined signal for providing a first and second sampling signal, each having a magnitude dependent upon the amplitude of said predetermined signal and upon the value of said electrical characteristic, the magnitude of said first comparison signal being such that it lies between the respective magnitudes of said sampling signals only when the value of said characteristic lies within said design limits, means for comparing a selected characteristic of a pair of signals even when the waveforms of the signals have dissimilar shapes, said comparing means having a first and second input, means for deriving a second comparison signal from said sampling signals, means for varying the magnitude of said second comparison signal between the magnitudes of said sampling signals, means for applying said first and second comparison signal to the first and second input, respectively, and means for detecting the occurrence of a null in the comparing means.

12. The system set forth in claim 11 wherein said predetermined signal comprises a voltage containing overshoot that under normal operation of said device has a magnitude that lies within upper and lower design limits, said design limits being specified as a percentage of the amplitude of said voltage, and wherein the transforming means comprises; means responsive to said voltage for providing a first comparison signal having a peak amplitude proportional to the amplitude of said voltage and substantially independent of said overshoot, means responsive to said voltage for providing first and second sampling signals, each having a peak amplitude proportional to the peak amplitude of said voltage, the amplitude of said first comparison signal being such that it lies between the respective amplitudes of said sampling signals only when the magnitude of said overshoot lies within said design limits.

13. The system set forth in claim 11 wherein said predetermined signal comprises a voltage containing droop that under normal operation of said device has a magnitude that lies within upper and lower design limits, said design limits being specified as a percentage of the amplitude of said voltage, and wherein the transforming means comprises: means responsive to said voltage for providing a first comparison signal that has an amplitude proportional to the amplitude of said voltage and substantially independent of said droop, means responsive to said voltage for providing first and second sampling signals, each having a peak amplitude proportional to the peak-to-peak amplitude of said voltage, the amplitude of said first comparison signal being such that it lies between the respective amplitudes of said sampling signals only when the magnitude of said droop lies within said design limits.

14. The system set forth in claim 11 wherein said predetermined signal comprises a waveform having a width that under normal operation of said device has a value that lies within upper and lower design limits, and wherein the transforming means comprises: means responsive to said waveform for providing a first comparison signal that has a magnitude proportional to the amplitude of said waveform and substantially independent of said width, means responsive to said waveform for providing first and second sampling signals, each having an amplitude proportional to the amplitude and a function of the width of said waveform, the magnitude of said first comparison signal being such that it lies between the respective amplitudes of said sampling signals only when the value of said width lies within said design limits.

15. The system set forth in claim 11 wherein said predetermined signal comprises a waveform having a rise time that under normal operation of said device has a value that lies within upper and lower design limits, and wherein the transforming means comprises: means responsive to said waveform for providing a first compraison signal that has a magnitude proportional to the amplitude of said waveform and a function of said rise time, means responsive to said waveform for providing first and second sampling signals, each having a magnitude proportional to the amplitude of said waveform and substantially independent of the rise time of said waveform, the magnitude of said first comparison signal being such that it lies between the respective magnitudes of said sampling signals only when the value of said rise time lies within said design limits.

16. The system set forth in claim 11 wherein said predetermined signal comprises a waveform having a decay time that under normal operation of said device has a value that lies within upper and lower design limits, and wherein the transforming means comprises: means responsive to said waveform for providing a first comparison signal that has a magnitude proportional to the amplitude of said waveform and a function of said decay time, means responsive to said waveform for providing first and second sampling signals, each having a magnitude proportional to the amplitude of said waveform and substantially independent of the decay time of said waveform, the magnitude of said first comparison signal being such that it lies between the respective magnitudes of said sampling signals only when the value of said decay time lies within said design limits.

17. The system set forth in claim 11 wherein said device comprises a frequency source whose output frequency comprises said predetermined signal and has a magnitude that under normal operation of the source lies within upper and lower design limits, and wherein said transforming means comprises: a first filter operating in its cut-off region, means for applying said output frequency to said first filter, the otuput of said first filter comprising a first comparison signal, a second filter operating in its cut-off region, means for applying said output frequency to said second filter, means connected to the output of said second filter for providing first and second sampling signals, the magnitude of said first comparison signal being such that it lies between the respective magnitudes of said sampling signals only when the magnitude of said output frequency lies within design limits.

18. The system set forth in claim 11 wherein said device comprises a frequency source whose output frequency comprises said predetermined signal and has a magnitude that under normal operation of the source lies within upper and lower design limits, and wherein said transforming means comprises: a first and second tuned circuit, the voltage-frequency characteristics of the tuned circuits being such that a substatnially linear portion of one intersects a substantially linear portion of the other and said output frequency lies on the intersecting portions of the characteristics, means for applying said output frequency to said first and second tuned circuit, means for deriving a first comparison signal from said first tuned circuit, means for deriving fiirst and second sampling signals from said second tuned circuit, the magnitude of said first comparison signal being such that it lies between the respective magnitudes of said sampling signals only when the magnitude of said output frequency lies within said design limits.

19. The system set forth in claim 11 wherein said device comprises a frequency source whose output frequency comprises said predetermined signal and has a magnitude that under normal operation of the source lies within upper and lower design limits, and wherein said transforming means comprises: a filter operating in its cut-off region, a divider, means for applying said output frequency to said divider and to said filter, means for deriving a first comparison signal from said filter, means for deriving first and second sampling signals from said divider, the magnitude of said first comparison signal being such that it lies between the respective magnitudes of said sampling signals only when the magnitude of said output frequency lies within said design limits.

20. In a system for detecting the presence of a fault in a device by evaluating an electrical characteristic of a predetermined signal that under normal operation of said device has a value that lies within upper and lower design limits, means for providing a reference signal, transforming means responsive to said reference signal and to said predetermined signal for providing a comparison signal and first and second sampling signals in such a manner that the amplitudes of said comparison signal and the sampling signals are each a function of said design limits, the magnitude of said comparison isgnal being such that it lies between the respective magnitudes of said sampling signals only when said characteristic lies within the design limits, comparing means having a first and second input for comparing the magnitude of a pair of signals, means for applying said comparison signal to the first input, means for applying said sampling signals in sequence to said second input, and zero-crossing detecting means connected to the output of said comparing means for determining whether the magnitude of said comparison signal lies between the magnitudes of said sampling signals.

21. The system set forth in claim 20 wherein said device comprises an amplifier whose output comprises said predetermined signal and has a magnitude that under normal operating conditions of said amplifier lies within upper and lower design limits, wherein said reference signal comprises the input signal to said amplifier, and wherein said transforming means comprises: means responsive to said reference signal for providing a first comparison signal having a magnitude dependent upon the magnitude of said input signal, means responsive to the output of said amplifier for providing first and second sampling signals, each having a magnitude dependent upon the magnitude of said output signal, the magnitude of said first comparison signal being such that it lies between the respective magnitudes of said sampling signals only when the magnitude of said output signal lies within the design limits.

22. The system set forth in claim 20 wherein said device comprises an amplifier whose output signal comprises said predetermined signal and has a magnitude that under normal operating conditions of said amplifier lies within upper and lower design limits, wherein said means for providing a reference signal comprises: a signal generator, means for deriving a reference signal from said signal generator, said system including signal applying means comprising: a terminal, an attenuator connected to the output of said signal generator, and switching means for connecting either said terminal or the output of said attenuator to the input of said amplifier, and wherein said transforming means comprises: means responsive to said reference signal for providing a first comparison signal having a magnitude dependent upon the magnitude of said input signal, means responsive to the output of said amplifier for providing first and second sampling signals, each having a magnitude dependent upon the magnitude of said output signal, the magnitude of said first comparison signal being such that it lies between the respective magnitudes of said sampling signals only when the magnitude of said output signal lies within the design limits.

23. The system set forth in claim 20 wherein said predetermined signal comprises a direct current output voltage having a magnitude that under normal operating conditions of said device lies within upper and lower design limits, wherein said transforming means comprises means responsive to said output voltage for deriving first and second sampling signals, each having a respective constant level, means for converting the constant level of each sampling signal to a pulsating direct current voltage means for deriving a first comparison signal from said reference signal, the magnitude of said first comparison signal being such that it lies between the respective magnitudes of said sampling signals only when the magnitude of said output voltage lies within said design limits.

24. The system set forth in claim 20 wherein said predetermined signal comprises a voltage having a magnitude that under normal operating conditions of said device lies within upper and lower design limits, said voltage containing overshoot, wherein said transforming means comprises means responsive to said output voltage for substantially eliminating said overshoot, means responsive to the output of said last-mentioned means for deriving first and second sampling signals, means for deriving a first comparison signal from said reference signal, the magnitude of said first comparison signal being such that it lies between the respective magnitudes of said sampling signals only when the magnitude of said output voltage lies within said design limits.

25. The system set forth in claim 20 wherein said predetermined signal comprises a voltage having a magnitude that under normal operating conditions of said device lies within upper and lower design limits, said voltage containing droop, wherein said transforming means comprises means responsive to the output voltage for substantially eliminating said droop, means responsive to the output of said last-mentioned means for deriving first and second sampling signals, means for deriving a first comparison signal from said reference signal, the magnitude of said first comparison signal being such that it lies between the respective magnitudes of said sampling signals only when the magnitude of said output voltage lies within said design limits.

26. The system set forth in claim 20 wherein said predetermined signal comprises a waveform having a rate of rise with a value that under normal operating conditions of said device lies within upper and lower design limits, and wherein the transforming means comprises: means for deriving a first comparison signal from said reference signal, means responsive to said waveform for providing first and second sampling signals, each having a magnitude dependent upon the rate of rise of said waveform, the magnitude of said first comparison signal being such that it lies between the respective magnitudes of said sampling signals only when the value of said rate of rise lies within said design limits.

27. The system set forth in claim 20 wherein said predetermined signal comprises a waveform having a rate of decay with a value that under normal operating conditions of said device lies within upper and lower design limits, and wherein the transforming means comprises: means for deriving a first comparison signal from said reference signal, means responsive to said waveform for providing first and second sampling signals, each having a magnitude dependent upon the rate of decay of said waveform, the magnitude of said first comparison signal being such that it lies between the respective magnitudes of said sampling signals only when the value of said rate of decay lies within said design limits.

28. In a system for detecting the presence of a fault in a device by evaluating an electrical characteristic of a predetermined signal that under normal operation of said device has a value that lies within upper and lower design limits, transforming means responsive to said predetermined signal for providing a comparison signal having a magnitude that is dependent upon the amplitude of said predetermined signal and substantially independent of said electrical characteristic, said transforming means including means responsive to said predetermined signal for providing a first and second sampling signal, each having a magnitude dependent upon the amplitude of said predetermined signal and upon the value of said electrical characteristic, the magnitude of said comparison signal being such that it lies between the respective magnitudes of said sampling signals only when the value of said characteristic lies within said design limits, means for comparing the magnitudes of a pair of signals, said comparing means having a first and second input, means for applying said comparison signal to the first input, means for applying said sampling signals in sequence to said second input, and zero-crossing detecting means connected to the output of said comparing means for determining whether the magnitude of said comparison signal lies between the magnitudes of said sampling signals.

29. The system set forth in claim 28 wherein said predetermined signal comprises a voltage containing overshoot that under normal operation of said device has a magnitude that lies within upper and lower design limits, said design limits being specified as a percentage of the amplitude of said voltage, and wherein the transforming means comprises: means responsive to said voltage for providing a first comparison signal having a peak amplitude proportional to the amplitude of said voltage and substantially independent of said overshoot, means responsive to said voltage for providing first and second sampling signals, each having a peak amplitude proportional to the peak amplitude of said voltage, the amplitude of said first comparison signal being such that it lies between the respective amplitudes of said sampling signals only when the magnitude of said overshoot lies within said design limits.

30. The system set forth in claim 28 wherein said predetermined signal comprises a voltage containing droop that under normal operation of said device has a magnitude that lies within upper and lower design limits, said design limits being specified as a percentage of the amplitude of said voltage, and wherein the transforming means comprises: means responsive to said voltage for providing a first comparison signal that has an amplitude proportional to the amplitude of said voltage and substantially independent of said droop, means responsive to said voltage for providing first and second sampling signals, each having a peak amplitude proportional to the peak-to-peak amplitude of said voltage, the amplitude of said first comparison signal being such that it lies between the respective amplitudes of said sampling signals only when the magnitude of said droop lies within said design limits.

31. The system set forth in claim 28 wherein said predetermined signal comprises a waveform having a width that under normal operation of said device has a value that lies within upper and lower design limits, and wherein the transforming means comprises: means responsive to said waveform for providing a first comparison signal that has a magnitude proportional to the amplitude of said waveform and substantially independent of said width, means responsive to said waveform for providing first and second sampling signals, each having a peak amplitude proportional to the amplitude and a function of the width of said waveform, the magnitude of said first comparison signal being such that it lies between the respective amplitudes of said sampling signals only when the value of said width lies within said design limits.

32. The system set forth in claim 28 wherein said predetermined signal comprises a waveform having a rise time that under normal operation of said device has a value that lies within upper and lower design limits, and wherein the transforming means comprises: means responsive to said waveform for providing a first comparison signal that has a magnitude proportional to the amplitude of said waveform and substantially independent of said rise time, means responsive to said waveform for providing first and second sampling signals, each having a magnitude proportional to the amplitudes of said waveform and a function of the rise time of said waveform, the magnitude of said first comparison signal being such that it lies between the respective magnitudes of said signals only when the value of said rise time lies within said design limits.

33. The system set forth in claim 28 wherein said predetermined signal comprises a waveform having a decay time that under normal operation of said device has a value that lies within upper and lower design limits, and wherein the transforming means comprises: means responsive to said waveform for providing a first comparison signal that has a magnitude proportional to the amplitude of said waveform and substantially independent of said decay time, means responsive to said waveform for providing first and second sampling signals, each having a magnitude proportional to the amplitude of said waveform and a function of the decay time of said waveform, the magnitude of said first comparison signal being such that it lies between the respective magnitudes of said sampling signals only when the value of said decay time lies within said design limits.

34. The system set forth in claim 28 wherein said device comprises a frequency source whose output frequency comprises said predetermined signal and has a magnitude that under normal operation of the source lies within upper and lower design limits, and wherein said transforming means comprises: a first filter operating in its cut-off region, means for applying said output frequency to said first filter, the output of said first filter comprising a first comparison signal, a second filter operating in its cut-off region, means for applying said output frequency to said second filter, means connected to the output of said second filter for providing first and second sampling signals, the magnitude of said first comparison signal being such that it lies between the respective magnitudes of said sampling signals only when the magnitude of said output frequency lies within said design limits.

35. The system set forth in claim 28 wherein said device comprises a frequency source whose output frequency comprises said predetermined signal and has a magnitude that under normal operation of the source lies within upper and lower design limits, and wherein said transforming means comprises: a first and second tuned circuit, the voltage-frequency characteristics of the tuned circuits being such that a substantially linear portion of one intersects a substantially linear portion of the other and said output frequency lies on the intersecting portions of the characteristics, means for applying said output frequency to said first and second tuned circuits, means for deriving a first comparison signal from said first tuned circuit, means for deriving first and second sampling signals from said second tuned circuit, the magnitude of said first comparison signal being such that it lies between the respective magnitudes of said sampling signals only when the magnitude of said output frequency lies within said design limits.

36. The system set forth in claim 28 wherein said device comprises a frequency source whose output frequency comprises said predetermined signal and has a magnitude that under normal operation of the source lies within upper and lower design limits, and wherein said transforming means comprises: a filter operating in its cut-off region, a divider, means for applying said output frequency to said divider and to said filter, means for deriving a first comparison signal from said filter, means for deriving first and second sampling signals from said divider, the magnitude of said first comparison signal being such that it lies between the respective magnitudes of said sampling signals only when the magnitude of said output frequency lies within said design limits.

37. In a system for detecting the presence of a fault in a device by evaluating the phase shift between the input and output signals of said device, means responsive to said input and output signals for providing a first comparison signal having a magnitude dependent upon the amplitudes of said input and output signals, means responsive to said input signal for providing a first and second sampling signal, each having a magnitude dependent upon the amplitude of said input signal, the magnitude of said first comparison signal being such that it lies between the respective magnitudes of said sampling signals only when the phase shift between said input and output signals has a value that lies within upper and lower design limits, means for comparing the magnitudes of a pair of signals, said comparing means having a first and second input, means for deriving a second comparison signal from said sampling signals, means for varying the magnitude of said second comparison signal between the magnitudes of said sampling signals, means for applying said first and second comparison signals to the first and second input, respectively, and means for detecting the occurrence of a null in said comparing means.

38. In a system for detecting the presence of a fault in a device by evaluating the phase shift between the input and output signals of said device, phase shifting means connected to the output of said device, means responsive to said input signal and the output of said phase shifting means for providing a first comparison signal having a magnitude dependent upon the amplitudes of said input signal and the output of said phase shifting means, means responsive to said input signal for providing a first and second sampling signal, each having a magnitude dependent upon the amplitude of said input signal, the magnitude of said first comparison signal being such that it lies between the respective magnitudes of said sampling signals only when the phase shift between said input and output signals has a value that lies within upper and lower design limits, means for comparing the magnitudes of a pair of signals, said comparing means having a first and second input, means for deriving a second comparison signal from said sampling signals, means for varying the magnitude of said second comparison signal between the magnitudes of said sampling signals, means for applying said first and second comparison signals to the first and second input, respectively, and means for detecting the occurrence of a null in said comparing means.

39. In a system for detecting the presence of a fault in a device by evaluating the phase shift between the input and output signals of said device, means responsive to said input and output signals for providing a comparison signal having a magnitude dependent upon the amplitudes of said input and output signals, means responsive to said input signal for providing a first and second sampling signal, each having a magnitude dependent upon the amplitude of said input signal, the magnitude of said comparison signal being such that it lies between the respective magnitudes of said sampling signals only when the phase shift between said input and output signals has a value that lies within upper and lower design limits, means for comparing the magnitudes of a pair of signals, said comparing means having a first and second input, means for applying said comparison signal to the first input of said comparing means, means for applying said sampling terminals in sequence to said second input of said comparing means, and zero-crossing detecting means connected to the output of said comparing means for determining whether the magnitude of said comparison signal lies between the magnitudes of said sampling signals.

40. In a system for detecting the presence of a fault in a device by evaluating the phase shift between the input and output signals of said device, phase shifting means connected to the output of said device, means responsive to said input signal and the output of said phase shifting means for providing a comparison signal having a magnitude dependent upon the amplitudes of said input signal and the output of said phase shifting means, means responsive to said input signal for providing a first and second sampling signal, each having a magnitude dependent upon the amplitude of said input signal, the magnitude of said comparison signal being such that it lies between the respective magnitudes of said sampling signals only when the phase shift between said input and output signals has a value that lies within upper and lower design limits, means for comparing the magnitudes of a pair of signals, said comparing means having a first and second input, means for applying said comparison signal to the first input of said comparing means, means for applying said sampling signals in sequence to the second input of said comparing means, and zero-crossing detecting means connected to the output of said comparing means for determining whether the magnitude of one said comparison signal lies between the magnitudes of said sampling signals.

41. In a system for evaluating an electrical characteristic of a predetermined signal provided by a signal generating device that under normal operation of said device lies within upper and lower design limits, a source of potential, means positioned in said device and responsive to the output of said source for generating said predetermined signal, transforming means responsive to the output of said source and to said predetermined signal for providing a comparison signal and first and second sampling signals, the magnitude of said comparison signal being such that it lies between the respective magnitudes of said sampling signals only when said characteristic lies within the design limits, comparing means for comparing the magnitudes of a pair of signals, said comparing means having a first and second input, means for applying said comparison signal to the first input of said comparing means, means for applying said sampling signals in sequence to the second input of said comparing means, and zero-crossing detecting means connected to the output of said comparing means for determining when the magnitude of said comparison signal lies between the magnitudes of said sampling signals.

42. In a system for detecting the presence of a fault in a device by evaluating the electrical characteristics of an input and output signal of said device, transforming means responsive to at least said input signal for providing at least one first comparison signal and a pair of sampling signals, transforming means responsive to at least said output signal for providing at least one second comparison signal and a pair of sampling signals, the magnitude of each comparison signal being such that it lies between the magnitude of its related sampling signals only when the associated electrical characteristic lies within predetermined design limits, a plurality of first and second comparing means, each for determining whether the magnitude of a comparison signal lies between the magnitudes of related sampling signals, means for applying each first comparison signal and its related sampling signals to a respective one of said first comparing means, means for applying each second comparison signal and its related sampling signals to a respective one of said second comparing means, indicating means responsive to the outputs of said first and second comparing means, and control means responsive to the outputs of the first comparing means for controlling the response of said indicating means to the outputs of the second comparing means.

43. The system set forth in claim 42 wherein said indicating means compromises: means responsive to the output of said first and second comparing means for providing a first indication, means responsive to the output of said first comparing means and the absence of the output of said second comparing means for providing a second indication, and means responsive to the absence of the output of said first comparing means and the output of said second comparing means for providing a third indication.

44. The system set forth in claim 42 wherein said control means comprises a plurality of switching means, each having a first and second state, a plurality of output terminals, each related to the first state of a respective one of said switching means, each switching means being dependent upon the output of a respective one of said first and second comparing means for providing a signal on its related output terminal, means for connecting the output terminals of certain ones of said switching means together and for grounding the output terminal of at least one other of said switching means, and wherein said indicating means responds to the combination of signals on said output terminals.

45. In a system for detecting the presence of a fault in a device by evaluating the electrical characteristics of an input and output signal of said device, transforming means responsive to at least said input signal for providing at least one first comparison signal and a pair of sampling signals, transforming means responsive to at least said output signal for providing at least one second comparison signal and a pair of sampling signals, the magnitude of each comparison signal being such that it lies between the magnitudes of its related sampling signals only when the associated electrical characteristic lies within predetermined design limits, a plurality of first and second comparing means, each for comparing the magnitude of a pair of signals, each comparing means having a first and second input, means for applying each first comparison signal to the first input of a respective one of said first comparing means and for applying the related sampling signals in sequence to the second input of the comparing means, means for applying each second comparison signal to the first input of a respective one of said second comparing means and for applying the related sampling signals in sequence to the second input of the comparing means, a plurality of first and second zero-crossing detecting means, each determining whether the magnitude of a comparison signal lies between the magnitudes of related sampling signals, means for connecting each first detecting means to the output of a respective one of said first comparing means, means for connecting each second detecting means to the output of a respective one of said second comparing means, indicating means responsive to the outputs of said first and second detecting means, and control means responsive to the output of said first detecting means for controlling the response to said indicating means to the outputs of said first and second detecting means.

46. The system set forth in claim 45 wherein said indicating means comprises means responsive to the output of said first and second zero-crossing detecting means for providing a first indication, means responsive to the output of said first detecting means and the absence of the output of said second detecting means for providing a second indication, and means responsive to the absence of the output of said first detecting means and the output of said second detecting means for providing a third indication.

47. The system set forth in claim 45 wherein said control means comprises a plurality of switching means, each having a first and second state, a plurality of output terminals, each related to the first state of a respective one of said switching means, each switching means being dependent upon the output of a respective one of said first and second zero-crossing detecting means for providing a signal on its related output terminal, means for connecting the output terminals of certain ones of said switching means together and for grounding the output terminal of at least one other of said switching means, and wherein said indicating means responds to the combination of signals on said output terminals.

(References on following page)

References Cited

UNITED STATES PATENTS

| | | | |
|---|---|---|---|
| 2,785,377 | 3/1957 | Mac Fee | 324—77 |
| 2,929,990 | 3/1960 | Maurer | 324—57 |
| 2,970,260 | 1/1961 | Flint | 324—73 |
| 3,286,232 | 11/1966 | Stanford | 324—98 XR |
| 2,940,071 | 6/1960 | Kindred | 340—347 |
| 3,163,849 | 12/1964 | Meyer | 340—146.2 |
| 2,722,659 | 11/1955 | Dickey | 324—57 |

RUDOLPH V. ROLINEC, Primary Examiner

E. L. STOLARUN, Assistant Examiner

U.S. Cl. X.R.

324—57, 68, 77, 83, 98, 103; 340—146.2